United States Patent
Bisig et al.

(10) Patent No.: US 9,022,345 B2
(45) Date of Patent: May 5, 2015

(54) VALVE

(76) Inventors: Roland Bisig, Einsiedeln (CH); Esad Ibrisimbegovic, Steinhausen (CH)

( * ) Notice: Subject to any disclaimer, the term of this patent is extended or adjusted under 35 U.S.C. 154(b) by 0 days.

(21) Appl. No.: 14/236,871

(22) PCT Filed: Aug. 4, 2011

(86) PCT No.: PCT/EP2011/003911
§ 371 (c)(1),
(2), (4) Date: Feb. 3, 2014

(87) PCT Pub. No.: WO2013/017142
PCT Pub. Date: Feb. 7, 2013

(65) Prior Publication Data
US 2014/0166138 A1    Jun. 19, 2014

(51) Int. Cl.
*F16K 31/12* (2006.01)
*F16K 11/00* (2006.01)
*F16K 15/02* (2006.01)
*F16K 27/02* (2006.01)
*B23P 11/00* (2006.01)

(52) U.S. Cl.
CPC ............ *F16K 11/00* (2013.01); *F16K 15/025* (2013.01); *F16K 27/0209* (2013.01); *B23P 11/00* (2013.01)

(58) Field of Classification Search
USPC .................... 137/494, 495, 537, 540, 543.13; 251/25, 28, 29, 324, 83
See application file for complete search history.

(56) References Cited

U.S. PATENT DOCUMENTS

| | | | |
|---|---|---|---|
| 886,045 A | 4/1908 | Ehrlich et al. | |
| 1,356,298 A * | 10/1920 | McGregor | 137/512.1 |
| 1,616,819 A | 2/1927 | Norris, Jr. | |
| 4,291,719 A | 9/1981 | Lehmann | |
| 4,425,938 A * | 1/1984 | Papa et al. | 137/489 |
| 4,637,495 A | 1/1987 | Blain | |
| 8,171,954 B2 * | 5/2012 | Hancock et al. | 137/543.13 |
| 8,333,216 B2 * | 12/2012 | Kim et al. | 137/495 |
| 2004/0261859 A1 * | 12/2004 | Callies | 137/495 |

FOREIGN PATENT DOCUMENTS

FR    1 014 135    8/1952

OTHER PUBLICATIONS

PCT/EP2011/003911 (filed Aug. 4, 2011) International Search Report dated Apr. 5, 2012.

* cited by examiner

*Primary Examiner* — John K Fristoe, Jr.
*Assistant Examiner* — R. K. Arundale

(57) ABSTRACT

A valve provided for the blocking or controlled establishment of a volume flow of a working fluid in a flow path of a technical device that transmits and/or stores energy, in particular in a control device for a hydraulic drive, an associated method of manufacture of the valve, and an apparatus with the valve. The valve includes first, second, and third valve openings, a moveable shut-off body moveable between an open-position and a close-position, a guide which guides the shut-off body between the open-position and the close position, and a retainer which exerts a retaining force on the shut-off body in the close-position. The guide has three guide parts. The first and third guide parts enclose the shut-off body and the second guide part includes a plurality of pins in a parallel orientation to the direction of movement of the shut-off body.

16 Claims, 7 Drawing Sheets

SECTION A-A

VALVE

FIELD OF THE INVENTION

The invention relates to a valve for controlling a volume flow of a working fluid in a flow path, in particular a valve for a hydraulic control device for controlling a hydraulic drive as one is used in elevator systems. Furthermore, the invention relates to a method for manufacturing such a valve and an apparatus for the load-pressure-compensated minimizing of the switching delay with the valve according to the invention for use in a control device of a hydraulic drive.

BACKGROUND OF THE INVENTION

Valves are used for blocking or establishing a controlled volume flow of a working fluid, or rather, of a liquid or gaseous fluid, or pressurizing medium, in virtually all technical fields in which fluids are used for transmission and/or storage of energy. They are applicable both in power conduits and in control conduits of pressurizing media driven control systems or regulating units and in this respect enable directly as well as indirectly the operation of pressurizing media driven actuators of all types in general; hydraulic control conduits differ from hydraulic power conduits essentially by their smaller cross section. As examples for such actuators servomotors, pumps, engines, compressors, clutches, brakes, and hydraulic or pneumatic springs, gears, and linkages are mentioned. In this respect, valves not only are of fundamental functional importance within hydraulic or pneumatic systems. Due to their varied application an essential portion of costs for manufacturing and maintenance of such systems falls to them, too.

In hydraulic drives, the driving power is known to be controlled by the pressure and the flow rate of a working fluid conducted in a circuit from a reservoir, usually in the form of an oil pan, via the delivery side of a motor-driven pump to a hydraulic consumer and from this back to the reservoir on the low-pressure side. The pump is usually a hydraulic pump with constant or variable delivery volume, such as a screw pump or a radial piston pump that is driven by an electric motor. As consumers are used servomotors and hydraulic motors respectively for generation of a translatory or rotatory output movement; the former may be configured as hydraulic cylinders, the latter as gear motors. For controlling the volume flow of the working fluid to and from the hydraulic consumer a control device with valves is provided in this connection in the flow path between the pump and the consumer. The working fluids controlled that way are preferably fluids on the basis of mineral oil, so-called hydraulic oils, synthetic fluids, or fluids on the basis of plants, wherein the latter being characterized particularly by its environmental compatibility. These working fluids can contain additives that permit a selective influencing of individual characteristics, such as the thermal characteristic, the aging resistance, or the corrosiveness.

Conventionally, each valve used in such a control device comprises a housing with a guide region and with borings, which form an inlet opening, an outlet opening, and a control opening of the particular valve, and a shut-off body in the form of a piston. The piston is in each case supported for sliding co-operation in the guide region of the housing and movably guided between an open-position, in which the valve is open and enables a flow connection between the inlet opening and the outlet opening, and a close-position, in which the valve is closed and prevents a flow connection between the inlet opening and the outlet opening. In addition, each of the valves has a retaining means between the housing and the piston usually comprising a compression spring and biasing the piston in each case in a defined rest position, hence in its open- or close-position.

Corresponding to the particular hydraulic flow scheme of the control device for a hydraulic drive, each of the valves is connected with its inlet opening, outlet opening, and control opening by a flow connection with the flow path for conducting the working fluid. As flow connections, or rather, tubing connections for conducting the working fluid within such a fluid system in principle all flow connections known to be suitable come into question, hence both rigid tubing elements, such as pipes or recesses in a housing of a particular element of the system, and flexible tubing elements, such as flexible tubes, wherein the particular flow connections can be made, for instance, of metal and/or plastic. Flow connections in the form of borings or other pre-formed recesses made, for instance, by metal casting in a part of a housing are frequently used, in particular in mechanical and in automotive engineering, since they cannot only be produced as to particularly low space requirements in virtually any pipe geometry, but they notably can be configured in compliance with the particular requirements to be considered as to stability, or rather, pressure and leak tightness without any difficulty, too.

In this regard, a control device for a hydraulic drive shall be mentioned exemplarily that controls the working fluid flow from a reservoir to the hydraulic drive and from the latter back to the reservoir. Such a control device usually comprises a so-called valve block which is formed in a way as specified and has between at least one inlet port and one outlet port a flow connection with in each case one control valve for controlling the working fluid flow in the supply and discharge of the hydraulic consumer, and one or several pilot control valves for activating the two control valves, if applicable, and the related flow connections in the form of hydraulic power conduits and control conduits for the hydraulic coupling of the valves as intended. The valve block typically is made of solid metal configured as cube-shaped housing and comprises, in addition to the recesses for the flow connections, recesses for receiving the particular valves. These recesses usually are realized as blind holes or milled-out portions in the valve block and either form the housing of the particular valve directly, wherein the inner surface of the recess comprises the guiding region, or the seat for a usually cupular or tubular valve housing formed separately. Whereas a recess having a surface finish obtainable by drilling or milling mostly suffices to be used as a seat for a separately formed valve housing, direct use of a recess in the valve block as guiding region for a piston movable between its close- and open-position implies in any case appropriate surface finishing, for instance by roller-burnishing, grinding, lapping, and/or honing, to ensure the valve function as required. A control device for a hydraulic elevator configured accordingly is disclosed, for instance, in U.S. Pat. No. 4,637,495. The valve block specified there on the one hand comprises valves with their particular guiding region being directly formed in the valve block, where the valve block thus constitutes the housing with the particular guiding region and in this respect is encompassed by the particular valve as functional part, too. On the other hand, however, this known valve block comprises also valves with separate cupular housings. For these valves the valve block thus merely constitutes a suitable valve seat with the necessary flow connections, whereas the particular valve forms a functional unit completely separated from the valve block in other respects.

Valves of these two embodiments are generally applicable in all of the afore-mentioned technical fields and are not limited to the specific use stated in U.S. Pat. No. 4,637,495.

Their adaption to the particular field of application primarily is carried out by an appropriate selection of the individual valve components with regard to geometry and material as well as by an appropriate dimensioning of retaining force of the retaining means, thus in this respect merely by an appropriate setting of the valve parameters in terms of the kind of working fluid to be controlled, the volume of the working fluid flow, and the pressure prevailing in the flow path with the valve structure unchanged in other respects. With those valve designs disclosed in U.S. Pat. No. 4,637,495, it is possible insofar to control volume flows of nearly all common working fluids at working fluid pressures usually prevailing within the particular fluid system, be it of a hydraulic or of a pneumatic type.

However, each of the two valve designs has disadvantages. So it is a disadvantage of the valve design with the guiding region for the movable piston directly formed in the valve block that this essential valve component has to be custom-made with the valve block, per se ruling out a cost-efficient large-scale production. The considerably higher surface quality required in any case for a guiding region of a valve in comparison to the rest of the recesses in the valve block is only attainable by additional process steps during manufacturing of the valve block as, namely, by roller-burnishing, grinding, lapping, and/or honing. Hence, this additional effort in manufacturing of the valve block on the one hand entails higher manufacturing costs for the valve block itself, and on the other hand higher manufacturing costs for the valve. Another major disadvantage of this valve design is that damage of the guiding region, which may be caused for instance by metallic foreign particles as a consequence of normal wear and tear during operation of the control device or by corresponding contaminants in the working fluid used, possibly may only be repaired by replacement of the entire valve block. Therefore, a valve of this embodiment not only is expensive in production, but insofar cost-intensive in operation, or maintenance, too.

The latter disadvantage, in fact, can be remedied by using a separate valve housing of the kind of the second valve design disclosed in U.S. Pat. No. 4,637,495, since such a valve in case of damage readily can be replaced without also replacing the valve block at the same time. The disadvantage of high production costs, however, also applies for such a valve in fact insofar as the required quantity of material and the machining effort during the manufacturing of the cupular or tubular valve housing are high. Because irrespective of whether the recess of the valve housing for sliding co-operation with the piston is made of a rod material, e.g. by drilling or milling, or of a pipe material, the valve housing still extends essentially over the entire length of the valve. In order to enable movement of the piston, and the valve function thereby, the valve housing must have appropriate openings in addition. These openings are generally produced individually in the wall of the housing in accordance with the particular intended use of the valve in a further manufacturing step typically by drilling or milling. A further process step is finally required to provide the inner surface of the valve housing with the necessary surface finish for the guiding region so that the piston can slidably co-operate with the guiding region in its movement between its close- and open-position. As already stated above, this process step for the surface finishing is usually carried out by roller burnishing, grinding, lapping, and/or honing. For a cylindrically shaped piston as illustrated in U.S. Pat. No. 4,637,495 generally the entire inner surface of the cupular or as a hollow cylinder formed valve housing is machined in this way in the region of the lateral area of the cylinder adjacent to the piston. Simply because of the cost of materials and the type and scope of process steps required for manufacturing the valve housing, production of such a valve is complex and cost-intensive with a substantial proportion of the production costs particularly being attributable to the fabrication of the valve openings.

It is therefore the problem of the invention to set forth a valve which is suitable for blocking or establishing of a controlled volume flow of a working fluid in a flow path of a technical device for transmission and/or storage of energy, particularly in a control device for a hydraulic drive, and which overcomes the disadvantages of the prior art, that therefore has its own valve housing having a guiding region which can be manufactured in a simpler and cheaper way, which additionally is designed easier to maintain, and is cheaper in operation and maintenance, and which ultimately can be manufactured also in a cost-saving way, in particular, within the bounds of large-scale production. Furthermore, the invention relates to a process for the manufacturing of such a valve and to a hydraulic apparatus for a working fluid with a particular embodiment of the inventive valve.

SUMMARY OF THE INVENTION

The problem underlying the invention is solved in that the valve for controlling a volume flow of a working fluid in a flow path in a known manner has a first valve opening, a second valve opening, and a third valve opening for providing for a flow connection with the flow path, a shut-off body movable between an open-position in which the third valve opening is open and a close-position in which the third valve opening is closed by the shut-off body, a guide means, or rather, a housing for guiding the shut-off body between the open- and the close-position, and a retaining means for exerting a retaining force on the shut-off body in the close-position, wherein the inventive valve differs from valves of a known design in that the shut-off body is formed at least in one piece and the guide means has in successive arrangement a first guide means part with a first guide means region, a second guide means part with a second guide means region, and a third guide means part with a third guide means region in permanent joint, wherein the first and third guide means part are configured for enclosing the shut-off body and the second guide means part comprises a plurality of pins in parallel alignment with the direction of movement of the shut-off body so that the movement of the shut-off body relative to the guide means can take place in sliding co-operation with the first and second guide means region and closing of the third valve opening by the shut-off body in sealing co-operation with the third guide means region, wherein the second guide means region comprises a part of the surface of at least one of the pins, and wherein the first guide means part comprises the first valve opening for exerting an actuating force on the shut-off body in the direction of the third valve opening, the second guide means part the second valve opening, and the third guide means part the third valve opening.

Specifically, the valve according to the invention is thus characterized in that the guide means and the shut-off body each have a plurality of corresponding, or rather, geometrically matching regions for sliding co-operation during the reciprocating motion of the shut-off body. Preferably, the guide means comprises in all three guide means parts of different structural design in sequential arrangement and in permanent joint each namely a first guide means part with a first guide means region, a second guide means part with a second guide means region, and a third guide means part with a third guide means region. Each of these guide means regions is formed in a corresponding manner with the shut-off body so that the latter is movable to and fro between the open- and close-position of the valve along its longitudinal extension, or rather, along the longitudinal axis of the valve relative to the guide means and is co-operating at least with each of the first and second guide means region in a sliding manner. Furthermore, the shut-off body and the third guide means region are interacting in a sealing manner in the close-position of the valve.

The guide means preferably comprises for this purpose in its first and third guide means part a bearing bush in which the shut-off body is axially supported in a slidable manner with its particular corresponding region in each case; in this respect, the first guide means region is formed by the wall of the bearing bush provided as the first guide means part facing the shut-off body, the third guide means region by the corresponding wall of the bearing bush provided as the third guide means part. The second guide means part comprises a plurality of pins, preferably three cylinder pins, that extend between the first and third guide means part in parallel alignment with the longitudinal axis of the valve and enclose the shut-off body preferably equidistantly spaced from each other. Each pin is in each case permanently fixed with its first end to the first guide means part and with its second end to the third guide means part in a way that the second guide means region comprises a part of the lateral area of at least one of the pins. If the pins in question are cylinder pins as preferred and the shut-off body in question is a rotational solid as preferred, the second guide means region may hence be limited by an appropriate spacing of the pins from the shut-off body as far as to the contact line between the at least one pin and the shut-off body; if a line contact takes place under application of a force the resulting thrust face is known to be rectangular. It is preferred, however, that all pins co-operate with the shut-off body in a sliding manner, hence, that the second guide means region comprises the contact lines of all pins with the shut-off body.

Thus, the first and the third guide means part along with the second guide means part comprising all of the pins constitute a functional unit and consequently the guide means of the valve, or rather, its housing with the guiding region. The first valve opening comprised in the first guide means part constitutes the control port of the valve. By way of the control port (also referred to as X- or Y-port) controlling of the valve is carried out. The third valve opening comprised in the third guide means part constitutes the inlet (also referred to as P-port) of the valve, whereas the outlet (also referred to as A-port) is constituted by the second valve opening comprised in the second guide means part. The second valve opening, however, can also constitute the inlet and the third valve opening the outlet depending on the particular use of the valve. In this case, the working fluid enters the valve through the second valve opening and exits the valve through the third valve opening, whereas otherwise the volume flow of the working fluid through the valve takes place in the opposite direction. In this respect, it has to be distinguished between two alternative embodiments of the valve according to the invention.

As compared with pilot-controllable valves designed in a conventional manner, the inventive valve structure enables considerable material savings by the guide means, or rather, housing not being made of solid matter, but merely comprises of two ring-shaped bearing bushes and a few pins. However, an advantageous saving of costs in the manufacture of the valve does not only result from material savings. Rather, the machining effort is reduced significantly, too, namely as the effective area of the entire guide means region is reduced particularly on the one hand by forming the second guide means region with a few pins only and as a complex surface processing of the pins is dispensed with on the other hand since they already feature the required surface finish as semi-finished parts. A reduction of the manufacturing costs for the inventive valve, however, also arises in particular from the fact that due to the formation of the second guide means region by pins at the same time and without any additional process step the second valve opening is formed by the spaces between the individual pins in the second guide means part. Moreover, this configuration ensures a high degree of maintainability as the entire guide means readily can be replaced in case of damage in the way specified above. If the damage, however, is limited to only one of the three guide means parts, there is also the possibility to repair the guide means by a simple replacement of the damaged part only, be it the ring-shaped first or third guide means part, and/or one of the pins of the second guide means part. Hence, ease of maintenance of the valve according to the invention advantageously goes along with lower maintenance costs for a fluid system with such valves, too, and gives rise to savings in operational costs at large. Finally, the modular structure of the guide means of only three different standardizable components in all—namely, of two simple bushings in the shape of a ring, or of a hollow cylinder, and of a few simple pre-fabricated pins of the same kind each—and the ease of how these components can be mounted merely by borings or corresponding pre-formed recesses facilitates an efficient and extremely cost-saving production in great quantities. The further cost-savings achievable through large-scale production of the guide means ultimately effect a further cost advantage of the inventive valve against valves of conventional design.

Through the realization of the second guide means part with pins and, going along with that without additional production expenditure, the substantial reduction of the contact area between the guide means and the shut-off body, the static and dynamic friction occurring during valve actuating can significantly and specifically be reduced in an extremely cost-effective way. This reduction of frictional losses directly causes an improved switching reliability and an extension of the service life of the valve constructed according to the invention and leads in a hydraulic drive system to a reduction of maintenance costs and to a stabilization of the output motion. Solely by the preferred utilization of standard pins which are available for that use in a good selection in nearly all eligible materials, finishes, dimensions, and tolerances as inexpensive semi-finished products and the considerable material savings in the manufacture of the guide means compared with conventional guide bushings going along with it, production costs of the inventive control valve are, in addition, well below those of a conventional valve, as already mentioned above. The utilization of such pins has the beneficial effect that the required dimensional tolerances for the guide means basically can be met by an exact alignment of the first and third guide means part, hence can be ensured without difficulty by an exact positioning of the recesses for receiving the pins in the respective region.

The first and third guide means part of the guide means are preferably made of metal, in particular of steel as turned or drilled part—in case of the first guide means part—and of aluminum as high pressure casting—in case of the third guide means part—, and are provided with recesses for the guide pins in each case. Alternatively, each of the guide bushings of the valve in each case can be modeled like that or from any other material typically utilized for valves, in particular brass or plastic, by means of the manufacturing technology as appropriate, such as turning, drilling, milling, casting, injection molding, forging, or sintering, especially laser sintering; moreover, it also may be advantageous for particular applications if at least one of the two guide bushings is provided as sintered part made of ceramics with shaping being done in this case by pressing or casting. Preferably, the permanent joint between these bushings and the guide pins is achieved by pressing without precluding, however, equivalent permanent or detachable common types of connections, such as adhesive bonding and/or screwing, for establishing of the permanent joint between the three guide means parts of the guide means.

Advantageous embodiments of the invention are apparent from the dependent claims and will be explained more extensively below.

Particularly in view of a simple and economic mounting of the inventive valve, the opening of the guide means for co-operating with the shut-off body and the retaining means is formed in accordance with the sequence of the guide means regions in such a way that the inner diameter of the guide means, or rather, its effective opening width decreases from the first via the second to the third guide means part, so that the opening of the guide means in the first guide means part is greater than in the second guide means part and in the second guide means part is greater than in the third guide means part. Alternatively, the opening width may also increase from the first via the second to the third guide means part in a corresponding manner. The valve function is ensured in this respect as the shut-off body is formed with appropriate corresponding shut-off body regions, so the shut-off body comprises a first, second, and third shut-off body region with the particular effective outer diameter being adapted to the corresponding opening width of the first, second, and third guide means part. The valve assembly, or rather, the insertion of the shut-off body and the retaining means in the guide means thereby is in each case possible from the guide means part with the greatest opening width. In this way, the relative movability of the shut-off body between the open- and close-position of the valve in relation to the guide means is limited by the third and first guide means part respectively.

It is advantageous and particularly preferred to configure the third guide means part in its region adjacent to the second guide means part with a plurality of recesses. These recesses are oriented relative to the longitudinal axis of the valve and may be tapered in the direction of closing of the valve. By way of example, these recesses are formed U-shaped, V-shaped, and/or Y-shaped. Additionally or alternatively, it is preferred to form the third guide means part in its region adjacent to the second guide means part with a bevel so that the third guide means region is tapered like a funnel in the direction of closing of the valve. Through these recesses and/or the bevel within the third guide means part in its region adjacent to the second guide means part, a continuous change of the effective area of the third valve opening during movement of the shut-off body within the third guide means part is made possible. With the inventive valve, a stabilization of the flow conditions during its actuation is achieved as far as possible that way, which in turn has an equally advantageous effect on the continuity of the output movement of the hydraulic drive in a hydraulic drive system. In addition, this preferred embodiment of the third guide means part of the inventive valve causes a reduction of the flow noises during operation of the valve and thus can effectively contribute to a reduction in noise within a fluid system. Subject to the material utilized for manufacturing of the third guide means part the recesses are formed particularly by milling, forging, casting, pressing, or injection molding.

With regard to a simpler and less expensive production and maintenance of the valve it is further preferred to provide the sealing region of the valve in its close-position or, more precisely the third guide means part in its front end facing away from the second guide means part as initially separately produced ring-shaped, preferably self-positioning, seal insert and to join this in the course of the valve assembly with the third guide means part, preferably by means of an O-ring, so that the ring-shaped seal insert and the third guide means part form a structural unit. The ring-shaped seal insert is designed to co-operate with the corresponding third shut-off body part of the shut-off body in such a manner that it merely contacts the third shut-off body region in the close-position of the valve along a, preferably circular, contact line enclosing the valve opening in a sealing manner. Hence, the third guide means region does not serve, like the first and second guide means region of the guide means, to directly guide the shut-off body when moving to and fro between the close- and open-position of the valve, but to ensure indirectly via the ring-shaped seal insert arranged within the third guide means region and therefore comprised therein a reliable closing of the valve in co-operation with said third shut-off body region of the shut-off body.

In a preferred embodiment of the inventive valve the shut-off body is formed in one piece with the first, second, and third shut-off body region and slidably arranged in the guide means with the particular corresponding first, second, and third guide means part. The retaining means, which is preferably provided in the form of a spring, in particular a cylindrical compression spring, co-operates at one end with the frontal outer surface of the shut-off body facing the first valve opening. Especially space saving is the alternative arrangement of the compression spring along the inner surface of a recess which extends in axial direction from the frontal outer surface of the shut-off body facing the first valve opening in the shut-off body. One end of the guided spring insofar co-operates with this inner surface. The other end of the compression spring protrudes from the recess. In either case, the compression spring extends more or less far into the first guide means part so that the shut-off body can be biased by it in the direction of the second valve opening via the first valve opening. For a defined application of the spring force to the shut-off body the first shut-off body region is preferably provided with a blind hole, which guides the compression spring along the longitudinal axis of the valve. In the alternative mounting of the compression spring, a defined alignment between the two elements is preferably ensured by suitable projections on the front face of shut-off body.

According to a further preferred embodiment of the inventive valve, the shut-off body is formed in two parts with a first and second shut-off body part. The first shut-off body part comprises the first and an additional fourth shut-off body region and the second shut-off body part the second, third, and an additional fifth shut-off body region. The fourth and fifth shut-off body region are mounted slidably interlocked in such a way that the length of the shut-off body is variable. In other words, the first and second shut-off body part are slidably supported against each other so that the total length of the shut-off body is variable, which in turn is made possible by the telescoping of the fourth to the fifth shut-off body region or vice versa. In this case the retaining means, preferably in the form of a spring, in particular a cylindrical compression spring, co-operates with the shut-off body in a way that the retaining force of the retaining means, or rather, the spring force on the one hand is applied to the second part of the shut-off body via its third shut-off body region and on the other hand to the first part of the shut-off body via its first shut-off body region, in fact so that a reduction in the length of the shut-off body on the one hand is effected by a movement of the first shut-off body part, of the second shut-off body part, or of each of the two shut-off body parts relative to each other, on the other hand that both shut-off body parts are movable relative to the guide means at constant length of the shut-off body against the retaining force of the retaining means. If the first shut-off body part in the close-position of the valve, in which the third shut-off body region of the second shut-off body part is in sealing contact with the third guide means region of the third guide means part, is charged with an actuating force in the direction of the second shut-off body part and against the retaining force of the retaining means, this results in a reduction in the length of the shut-off body proportional to said actuating force. The maximum adjustability and therefore the minimal length of the shut-off body is thus reached when both shut-off body parts abut on each other; if the degree of overlap of the fourth shut-off body region of the first shut-off body part and the fifth shot-off body region of the second shut-off body part is 50% in the rest position of the retaining means, the resulting maximum adjustability is consequently half of the penetration depth of the fourth in the fifth shut-off body region or vice versa.

The compression spring is configured in such a way that the length of the shut-off body in the rest position of the compression spring can be reduced by an actuating force acting on the frontal outer surface of the first shut-off body part facing the first valve opening in the direction of the second valve opening and/or on the frontal outer surface of the second shut-off body part facing the second valve opening in the direction of the first valve opening against the retaining force of the compression spring in each case. For this purpose, the compression spring can co-operate with the two shut-off body parts in two equally preferred ways. According to the first alternative, the compression spring is arranged around the two interlocked shut-off body regions of the first and second shut-off body part of the shut-off body, in fact so that one end of said spring is fixed to the outer surface of the first shut-off body part at the end of the fourth shot-off body region facing the first shut-off body region and the other end to the outer surface of the second shut-off body part at the end of the fifth shot-off body region facing the second shut-off body region. According to the second alternative, the compression spring is provided in the cavity encased by the two shut-off body parts so that it co-operates at one end with the inner surface of the first shut-off body part and at the other end with the inner surface of the second shut-off body part; these inner surfaces are comprised in the respective recess of the first and second shut-off body part. Hence, it is ensured in both alternatives that the shut-off body can be biased via the first valve opening in the direction of the second valve opening. Although it is preferred to form the shut-off body either one-part or two-part in the manner indicated above, it may, in particular in applications where small valve dimensions at equally large operating displacements of the shut-off body are required, be of advantage to provide a shut-off body of more than two shut-off body parts. Such designs of the shut-off body with a telescopic configuration of more than two shut-off body parts corresponding to the two-part design are therefore explicitly encompassed by the invention as further particular embodiments of the valve according to claim 1.

Irrespective of the particular form, the shut-off body is preferably made of metal, notably steel, brass, or aluminum or of a non-metallic material suitable for this application, in particular plastic or ceramic, thereby applying the known processing methods as appropriate, such as turning, drilling, milling, molding, pressing, forging, sintering, especially laser sintering, or injection molding. The pins comprised in the second guide means part are preferably pre-fabricated in a usual way as steel-pins from bar stock. In this regard, it is particularly advantageous to provide the pins as semi-finished products already with the required surface finish and in the desired length so that they can be connected without any additional processing step directly by force fitting with one end each in the recesses provided for this purpose in the first guide means part and with the other end each in the recesses provided for that purpose in the third guide means part. The pins and the recesses are sized to this end preferably in such a way that a compression joint of sufficient strength is guaranteed in any case.

The embodiment of the inventive valve with a two-part shut-off body is particularly suitable for controlling in a control device for a hydraulic drive the volume flow of the working fluid from a reservoir to the hydraulic drive in the bypass mode. In such a drive system the valve in this embodiment has the additional important advantage that it enables an automatic bias adjustment under changing operating conditions, such as fluctuations of load and/or temperature within the hydraulic drive system, whereby a corresponding adjustment of the circulating pressure or pilot pressure of the working fluid in the hydraulic system is rendered superfluous.

In a further particular embodiment of the valve according to the invention, the shut-off body is provided with a pistil-shaped projection at its end associated with the third guide means part. This pistil-shaped projection is formed in such a way that it can act in the manner of a baffle plate for a volume flow of the working fluid discharged from the valve, hence damps the volume flow of the working fluid that exits the third valve opening. Through the permanent joint of the pistil-shaped projection with the shut-off body, the kinetic energy of the working fluid which is released during attenuation acts back as actuating force on the shut-off body which thus can be moved to its close-position by the volume flow of the working fluid; in this respect, the actuating force generated through damping acts in the same direction as the retaining force of the retaining means by which the shut-off body is to be held in its close-position. This embodiment of the inventive valve has the advantage of an even more constant controllability of the volume flow of the working fluid. For the specified purpose, the pistil-shaped projection equally advantageously may be formed both on a one-part and on a multi-part shut-off body.

Hence, the valve to which the invention pertains can in principle be used for all kind of technical equipment, which is operated by a pressurizing medium. Because of its special functional advantages and the cost savings potential due to its capability for large-scale production and its ease of maintenance, the inventive valve is particularly suitable for use in fields like mechanical engineering, vehicle technology, automotive industry, process engineering, supply engineering, and building automation.

The invention also relates to a method for producing an inventive valve for controlling a volume flow of a working fluid in a flow path having a first valve opening—the control port of the valve—, a second, and a third valve opening the valve outlet port and the valve inlet port, or the valve inlet port and the valve outlet port—, an at least one-part shut-off body which is movable between an open-position in which the third valve opening is open to allow a volume flow of the working fluid between the second and third valve opening and a close-position in which the third valve opening is closed by the shut-off body, a guide means for guiding the shut-off body between the open- and close-position, and a retaining means for exerting a retaining force on the shut-off body in the close-position.

This method comprises the following steps, wherein the sequence of the individual process steps also may deviate from the sequence given below: (1) Providing the shut-off body for co-operating in a sliding manner with the guide means; (2) Providing a first guide means part with a first guide means region for enclosing the shut-off body and co-operating with the latter in a sliding manner and for forming the first valve opening; (3) Providing a third guide means part with a third guide means region for enclosing the shut-off body and co-operating with the latter in a sliding manner and for forming the third valve opening; (4) Providing a plurality of pins for forming a second guide means part with a second guide means region for co-operating in a sliding manner with the shut-off body and for forming the second valve opening; (5) Establishing a connection between one end of each pin and the first guide means part and between the other end of each pin and the third guide means part under parallel orientation of each pin in the direction of movement of the shut-off body so that between the first and third guide means part the second guide means part is formed with the second valve opening, at the free end of the first guide means part the first valve opening is formed, at the free end of the third guide means part the third valve opening is formed and from the first, second, and third guide means part in successive arrangement and in permanent joint the guide means for guiding the shut-off body is formed; (6) Providing the retaining means for exerting the retaining force on the shut-off body in the close-position; (7) Disposing the retaining means on the shut-off body so that the retaining force of the retaining means acts in the direction of the close-position of the shut-off body; (8) Disposing the shut-off body and the retaining means in the guide means so that the movement of the shut-off body relative to the guide means takes place under sliding co-operation with the first guide means region and a section of the surface of at least one of the pins of the second guide means region and the closure of the third valve opening by the shut-off body takes place under sealing co-operation with the third guide means region and under the effect of the retaining force of the retaining means.

Hence, the valve manufacturable with the method according to the invention has all the characteristics of the valve according to claim 1, which has been previously explained in detail with its components and specific embodiments according to the dependent claims, taking into account the essential aspects of the manufacture in each case. In this respect, such information shall be used in view of the claimed manufacturing process, too. Further details regarding the manufacturing of the inventive valve will appear from the description of the advantageous embodiments shown in the drawings.

Another object of the invention is, finally, an apparatus with the inventive valve for the load-pressure-compensated control of a volume flow of a working fluid from a second to a first direction in a flow path toward a time-varying load pressure acting in the second direction in the flow path. This apparatus is characterized in that it comprises a valve according to claim 7, a throttle element, a check valve, a hydro-mechanical transmission means, a first working fluid port for establishing a flow connection with the flow path for conducting the volume flow of the working fluid in the first direction, and a second, and third working fluid port for establishing a flow connection in each case with the flow path for conducting the volume flow of the working fluid in the second direction, a flow connection between the first working fluid port in each case and the third working fluid port and the first valve opening, and furthermore a flow connection is provided in each case between the third valve opening and the first working fluid port, between the second valve opening and the second working fluid port, and between the first valve opening and the third working fluid port, wherein the flow connection between the first valve opening and the third working fluid port comprises in parallel arrangement the throttle element for damping the volume flow of the working fluid from the first valve opening, the check valve for conducting the working fluid to the first valve opening, and the flow connection between the first valve opening and the first working fluid port comprises the hydro-mechanical transmission means for mechanically moving the shut-off body at the first valve opening so that at a volume flow of the working fluid in the flow path in the first direction an increase of the working fluid pressure at the first working fluid port allows a pre-positioning of the shut-off body of the valve at the first valve opening in the direction of its close-position by the hydro-mechanical transmission means under working fluid flow through the flow connection between the first and third working fluid port and through the check valve toward the first valve opening, and an increase of the working fluid pressure at the third working fluid port allows a movement of the pre-positioned shut-off body to its close-position for controlling the volume flow of the working fluid in the flow path from the second to the first direction.

The control function allowed by the inventive apparatus is thus based essentially on the valve according to claim 1 in the particular embodiment with a two-part shut-off body according to claim 7. Without this external configuration as provided by the apparatus, said valve in a fluid system generally allows control of a volume flow of the working fluid between a bypass mode, in which the volume flow of the working fluid can be directed away from a consumer by the valve, and an operating mode, in which the valve is closed due to a suitable pilot pressure signal at its control port and thus the volume flow of the working fluid being directable to the consumer. This valve allows thereby a controlled operation of a consumer in a fluid system without direction reversal and without interruption of a volume flow of a working fluid continuously generated by a volume flow generating means, such as a motor-driven pump, in a flow path in one direction, hence a diversion of the volume flow of the working fluid in a flow path from the first direction to the opposite direction, or rather, second direction. For this purpose, the retaining force of the retaining means of the valve is adapted to the working fluid pressure prevailing in the flow path in a way that even a minimum working fluid pressure at the valve inlet suffices to move the shut-off body, more specifically its second shut-off body part, from its close- to its open-position; the valve, therefore, can open once a reverse pressure against a volume flow of the working fluid conducted in the flow path in the first direction reaches a defined value.

For closing the valve in the operating state of the fluid system—hence, while the volume flow generating means is in operation—, an appropriate pressure signal must be present at the control port of the valve, or rather, on its first valve opening through which the two-part shut-off body is movable from its open- to its close-position. Such a control signal can be generated in principle in different ways, e.g. by an appropriate volume flow of a working fluid just as by a direct or indirect electrical, mechanical, or manual actuation of the first shut-off body part of the shut-off body of the valve. The control port of the valve has in addition to the flow connection with the first working fluid port a further flow connection with the third working fluid port, which enables a corresponding external configuration in each case. It is advantageous to design this external configuration as controllable flow connection for conducting the working fluid exiting the apparatus through the third working fluid port. In this manner, the feed forward control can be carried out merely by opening and closing of a suitable switching element, such as a manually or electromechanically controllable throttle element, to be provided in said flow connection, e.g. to a reservoir. Closing of such a throttle element in a flow connection connected to the third working fluid port specifically causes a movement of the shut-off body of the valve comprised in the apparatus from its open- to its close-position. This has the result that the working fluid in the flow path connected with the first working fluid port between the reservoir and the consumer can overcome the reverse pressure acting in the second direction and a volume flow of the working fluid in the flow path in the first direction to the consumer is initiated, hence the latter is driven by the working fluid.

In operating a fluid system having the inventive apparatus and a consumer, for example in the form of a hydraulic cylinder and a hydraulic motor respectively, the output load acting on the piston of the hydraulic cylinder and on the drive shaft of the hydraulic motor respectively generates a counter pressure onto the working fluid in the flow path, which in this respect acts in the opposite direction of the volume flow of the working fluid, i.e. in the second direction. This counter pressure has to be overcome by the inventive apparatus, more precisely by the shut-off body of the valve comprised therein as it moves to the close-position; the load pressure is usually variable over time and may vary between zero and the admissible maximum load pressure limit for the particular drive. In the case of a working fluid provided in the flow path with constant pressure, as is usual, such load-pressure-fluctuations have a negative impact as to counteract the volume flow of the working fluid in the flow path in the first direction and therefore the shut-off body of the valve during its closing movement, whereby closing of the valve is delayed depending on the output load. Consequently, a dead time, or switching delay, dependent on the respective dead load ensues at each starting of operation of a consumer in a fluid system; the dead time is defined here as the time period that elapses between the control signal for the start of the consumer and the beginning of its output movement. Regarding the inventive apparatus, dead time, or switching delay, has therefore to be construed as the amount of time between a rise of the working fluid pressure at the third working fluid port for moving the shut-off body of the valve to its close-position and the initiation of the working fluid flow to the consumer. Hence, the closing operation of the valve corresponds to the switching of the apparatus from the bypass mode to the operating mode.

Therefore, the partial problem to be tackled is to specify an apparatus which overcomes this disadvantage, which enables thus in a fluid system with a consumer a switching from a bypass mode to an operating mode of the consumer independent of load pressure and without dead time to the greatest possible extent in each case. This partial problem is solved by the apparatus specified above using the inventive valve. This apparatus enables switching, or rather, unblocking of a volume flow of a working fluid as generated by means of a motor-driven pump in a flow path of a fluid system in the first direction from a reservoir to a consumer, for example, virtually without any time lag and substantially independent of the particular output load of the consumer, i.e. with just minimal and load-independent dead time, and can be used in principle in all fluid systems with consumers, or rather, actuators driven by a pressurizing medium. By a suitable design of the individual components of the inventive apparatus with regard to the maximum pressure prevailing in the respective flow path it has to be made sure at all events that the load-pressure-compensation and the reduction of the switching delay when switching from the bypass mode to the operating mode are reliably fulfilled within the particular parameter limits. Specifically, this includes a suitable adjustment of the geometry of the individual apparatus components and of the particular retaining and actuating forces to the volume flows to be switched in each case.

Of particular advantage is the design of the valve with regard to a maximized adjusting range of the shut-off body, or rather, to a relatively large movability of the two shut-off body parts of the shut-off body to each other for covering the largest fluid pressure range, or rather, output load range of the consumer in a fluid system possible and with regard to the compensation of transient load-pressure-peaks at maximum output load of the consumer in the fluid system. While the former is to be ensured by a suitable geometric dimensioning of the overlapping areas of the two telescopically co-operating shut-off body parts and, if applicable, by the use of additional shut-off body parts in the manner described above, the latter additionally requires an appropriate dimensioning of the retaining means of the valve comprised in the apparatus so that also in the operating mode of the consumer connected to the apparatus always a part of the volume flow of the working fluid can be conducted through the bypass valve in a circle; this continuous bypass operation insofar corresponds to a further enlargement of the adjusting range of the shut-off body as in this valve design a complete closing of the valve only takes place in case of dynamic load-pressure-peaks occurring at the maximum allowable output load of the apparatus in order to compensate for these.

The apparatus thus comprises the following components, the interaction of which will further be explained in detail now:

As already indicated above, the valve having a two-part shut-off body is connectable with its third valve opening—the inlet—via the first working fluid port to the flow path for conducting the volume flow of the working fluid in the first direction so that the working fluid entering the apparatus through the first working fluid port on the one hand can flow through the valve from the third to the second valve opening—the outlet—and can continue to flow from there to the second working fluid port, but on the other hand simultaneously can reach the first valve opening almost unimpeded via the flow connection provided between the first and third working fluid port and the check valve. This ensures that during a movement of the shut-off body from the open- to the close-position working fluid can flow to the first valve opening—the control port—so that a formation of a vacuum in the region of the first valve opening at all events reliably is avoidable; abrupt closing of the valve is prevented by the working fluid pressure acting in the opposite direction on the shut-off body at the third valve opening. If, however, the shut-off body of the valve moves from the close-position to the open-position, the working fluid can only flow away through the throttle element from the first valve opening so that a sudden opening of the valve can be prevented; the throttle element therefore in particular also ensures that no undesirable pressure fluctuations and/or vibrations occur in the working fluid by the use of the apparatus in an associated fluid system. By means of the check valve and of the throttle element as well as of the flow connection between the first and third working fluid port a defined opening an closing of the valve is ensured in any case in this respect and thus a defined switching of the inventive apparatus from the bypass mode to the operating mode of an associated consumer.

As already indicated, the apparatus according to the invention is pilot-controllable via the third working fluid port by connecting the latter with a reservoir by means of a flow connection, for instance, and switching this connection by means of a suitable control element between an open- and a close-position; pilot controlling of the valve comprised in the apparatus is thus effectuated via the third working fluid port, which in turn allows to control the volume flow via the first and second working fluid port in an associated flow path. As long as in such a configuration the control element is open, the working fluid can therefore flow directly back into the reservoir without exerting an actuating force on the shut-off body at the first valve opening. The shut-off body, more precisely its first shut-off body part, is moved in this case into its rest position by the retaining means comprised in the valve. In the rest position the retaining means has its maximum length so that the possible operating displacement of the second shut-off body part is greatest, too, which in turn allows for maximum opening of the valve for the bypass mode. At closing of the control element when a working fluid under pressure acts on the first working fluid port of the apparatus, the working fluid flows, however, through the check valve to the first valve opening and causes there an actuation of the shut-off body in the direction of the third guide means part of the valve. In detail, a corresponding first actuation of the second shut-off body part takes place thereby almost at the same time by which the shut-off body takes its minimum length due to the working fluid pressure acting at the third valve opening against the retaining force of the retaining means and a corresponding second actuation of the first shut-off body part positioning the shut-off body along the longitudinal axis of the valve, hence controls the possible opening of the valve for the bypass mode dependent on the pressure.

When the hydro-mechanical transmission means in the apparatus configured such is connected by means of a flow connection at the first valve opening via the first working fluid port with the load-pressurized flow-path, this results in an indirect mechanical actuation of the shut-off body at the first valve opening with concurrent flow of the working fluid via the check valve to the first valve opening; for that purpose, the hydro-mechanical transmission means is designed in a conventional manner with a hydraulically actuatable plunger for converting a hydraulic pressure signal to a proportional mechanical displacement signal which is hydraulically indirectly actuatable, i.e. without working fluid entry into the first control valve. The actuation of the hydro-mechanical transmission means is therefore substantially proportional to the force, or rather, load acting on the working fluid in the flow path for conducting it in the second direction. By a suitable structural arrangement toward the first valve opening, the plunger is directly mechanically coupled to the shut-off body, more precisely to its first shut-off body part, so that the outward movement of the plunger can move the first shut-off body part in the direction toward the second shut-off body part against the retaining force of the retaining means of the valve and, consequently, the entire shut-off body in the direction toward the third valve opening. In order to eliminate, particularly in the event of transient pressure increases, the risk of adverse formation of a vacuum, or rather, negative pressure in the connecting region, more precisely in the first guide means part of the valve, and at the same time to further shorten the dead time, the first valve opening is additionally connected to the flow path for conducting the volume flow of the working fluid in the first direction through the check valve. This check valve, which is preferably configured with a compression spring as actuating means, opens at a defined threshold in the feed direction of the working fluid toward the first valve opening and blocks the working fluid flow in the opposite direction. Through the check valve a defined and largely delay-free flow of the working fluid into the first guide means part of the valve is possible that way, avoiding an undesirable vacuum formation or negative pressure; as is known vacuum formation or negative pressure inside a valve results in unstable switching behavior with undefined switch positions and should therefore be avoided.

At a volume flow of the working fluid in the flow path in the first direction, an increase of the working fluid pressure at the first working fluid port of the apparatus of the invention causes hence a pre-positioning of the shut-off body of the valve at the first valve opening in the direction toward its close-position by the hydro-mechanical transmission means with subsequent flow of the working fluid via the flow connection between the first and third working fluid port and the check valve to the first valve port. An increase of the working fluid pressure at the third working fluid port that way results in a movement of the pre-positioned shut-off body toward its close-position which, in turn, allows routing of the volume flow of the working fluid in the flow path from the second to the first direction. In other words, by the load-pressure-dependent pre-positioning of the shut-off body up to abutting in a sealing manner on the third guide means in the region of the third valve opening not only the operating displacement of the shut-off body of the valve is reduced, but also the volume of the working fluid required for this displacement which must flow into the valve via the first valve opening for this actuation. As a result, the apparatus of the invention thus allows in a fluid system with a consumer not only a load-pressure-compensated switching from a bypass mode to an operating mode, but also one substantially without dead time.

According to the invention, the apparatus comprises as an essential component a valve having the features recited in claim 1 in combination with the features recited in claim 7. This valve is characterized in terms of its function over conventionally configured differential piston valves, in addition to the specific design of the two shut-off body parts of the shut-off body, in particular by a reduced friction between the guide means and the shut-off body and is therefore particularly suitable for the specified use and thereby for the solution of the partial problem underlying the apparatus. Notwithstanding, the specified apparatus can alternatively be realized with a conventional valve having a two-part differential piston, too, or particularly with a valve having a two-part piston corresponding to the features recited in claim 7 combined with a conventional guide means which is formed, for instance, as a recess in a metallic valve block or as a separate bushing-shaped or cupular housing with the necessary valve openings in each case. This alternative embodiment of the apparatus for the load-pressure-compensated routing of a volume flow of a working fluid from a second to a first direction in a flow path against a time variable load pressure acting in the second direction in the flow path, hence, has the features as specified below:

A valve for controlling a volume flow of a working fluid in a flow path having a first, second, and third valve opening, a shut-off body, a guide means, and a retaining means. The shut-off body of the valve is configured to be movable between an open-position and a close-position, wherein the third valve opening is open in the open-position of the valve so that a volume flow of the working fluid is possible between the third and second valve opening, and wherein the third valve opening is closed in the close-position of the valve by the shut-off body. The guide means is provided in such a way that it guides the shut-off body in its movement between the open- and the close-position. The retaining means is disposed between the guide means and the shut-off body in a way that its retaining force is biasing the shut-off body guided by the guide means in the close-position of the valve. The shut-off body comprised in the valve is formed two-part with a first and second shut-off body part, wherein each of the two shut-off body parts in each case has a plurality of specifically configured shut-off body regions for sliding co-operation with each other and with the guide means. The first shut-off body part comprises a first and fourth shut-off body region, the second shut-off body part a second, third, and fifth shut-off body region. The two shut-off body parts are associated with each other so that they are supported interlockingly movable by the fourth and fifth shut-off body region, in such a way that by a relative movement of the two shut-off body parts toward each other the length of the shut-off body along the direction of movement predetermined by the guide means is variable, while at the same time the first shut-off body part with its first shut-off body region and the second shut-off body part with its second shut-off body region in each case co-operate in a sliding manner with the guide means. The retaining means is disposed between the first shut-off body region of the first shut-off body part and the second shut-off body region of the second shut-off body part so that the fourth and fifth shut-off body region overlap in the rest position of said retaining means and the length of the shut-off body can be reduced by displacing the two shut-off body parts against the retaining force of the retaining means.

Moreover, the apparatus in the alternative embodiment comprises a throttle element, a check valve, a hydro-mechanical transmission means, a first, second, and third working fluid port, and several flow connections. The first working fluid port is provided for establishing a flow connection with the flow path which conducts the volume flow of the working fluid in the first direction. The second and third working fluid port, in contrast, in each case serves for establishing a flow connection with the flow path which conducts the volume flow of the working fluid in the second direction. A flow connection is provided in detail between the first and third working fluid port and between said first working fluid port and the first valve opening. The apparatus comprises in addition a flow connection each between the third valve opening and said first working fluid port, between the second valve opening and the second working fluid port, and between said first valve opening and said third working fluid port. In the flow connection between the first valve opening and the third working fluid port, the throttle element and the check valve are provided in parallel arrangement so that the throttle element can attenuate the volume flow of the working fluid directed away from the first valve opening and the check valve can conduct the working fluid toward the first valve opening. The hydro-mechanical transmission means is comprised in the flow connection between the first valve opening and the first working fluid port and intended for mechanical co-operation with the shut-off body of the valve at the first valve opening so that an increase in pressure in the flow path with the working fluid conducted in the first direction through the first working fluid port and the hydro-mechanical transmission means can cause a corresponding pre-positioning of the shut-off body of the valve at the first valve opening in the direction of its close-position, while almost at the same time a flow of working fluid toward the first valve opening can be ensured via the flow connection between the first and third working fluid port and via the check valve. The complete closing of the valve can be effectuated by increasing the working fluid pressure at said third working fluid port via the first valve opening and the already pre-positioned shut-off body which, in turn, enables routing of the volume flow of the working fluid in the flow path form the second to the first direction.

Such an alternative embodiment of the apparatus according to the invention, however, particularly has the disadvantage of increased friction between shut-off body and guide means and exhibits additionally the economic and production-related disadvantages stated above in connection with the inventive valve.

BRIEF DESCRIPTION OF THE DRAWINGS

Preferred embodiments of the present invention will be explained below in an exemplary manner with reference to the accompanying drawings. In the drawings.

DETAILED DESCRIPTION OF THE INVENTION

Figure 1:
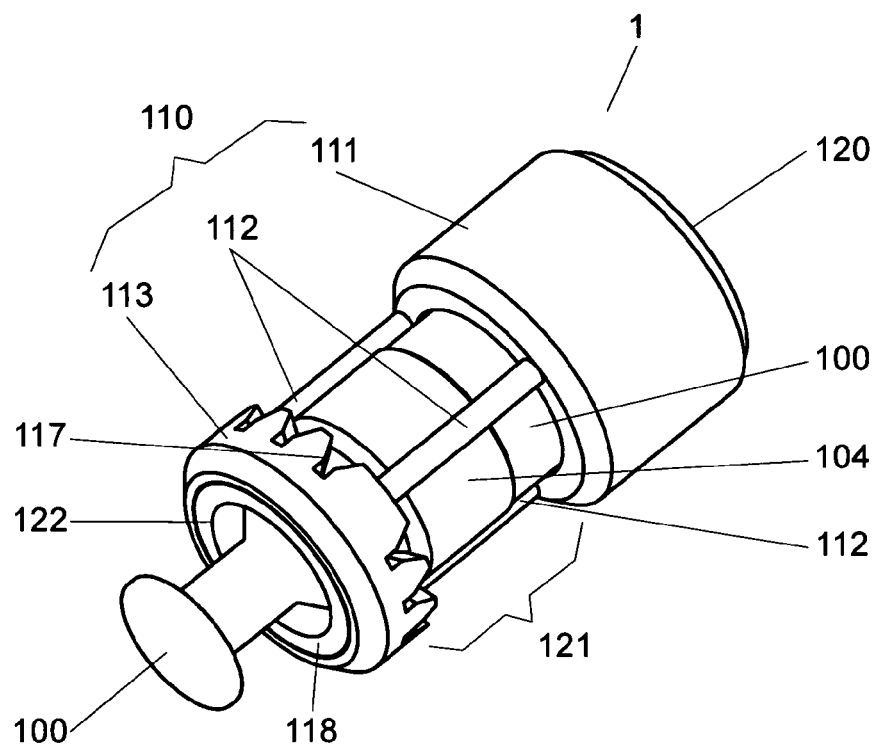
FIG. 1 is a perspective view of a first embodiment of the inventive valve.

The preferred embodiments of the invention illustrated in the drawings set forth the best mode for carrying out the invention in each case. This best working example of the present invention will be described in detail below in each case.

FIGS. 1 to 5 show a first embodiment of the inventive valve 1 with a one-part shut-off body 100 in different views. A second embodiment of the valve 1, which differs from the first embodiment essentially by a two-part design of the shut-off body 100, is illustrated in each corresponding representation in FIGS. 6 to 10. The two embodiments of the valve are therefore explained in the following with reference to each of the particular corresponding representations.

Figure 6:
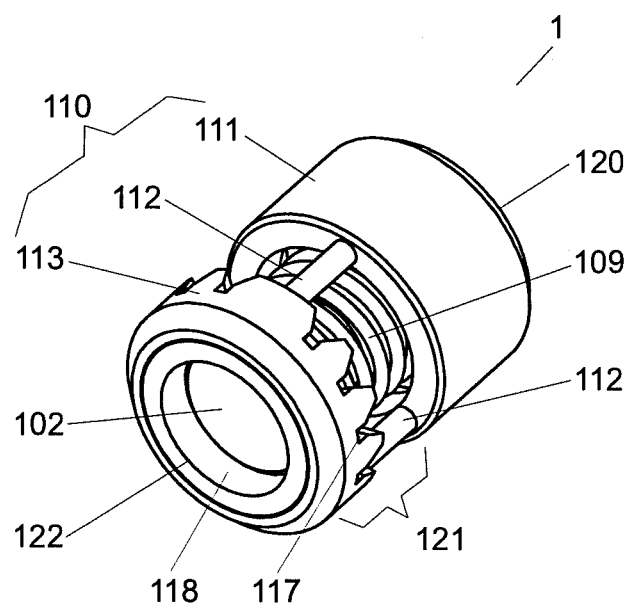
FIG. 6 is a perspective view of a second embodiment of the inventive valve.

FIGS. 1 and 6 show the first and second embodiment of the valve 1 in perspective top view as seen from the third valve opening 122 to the first valve opening 120 in each case. In both illustrations, the valve 1 is depicted in its close-position, which is also the rest position of the respective shut-off body 100. Each of the two embodiments comprises a guide means 110 formed identical as the valve body, which encloses the particular shut-off body 100 for the sliding co-operation along its particular longitudinal extent. The guide means 110 has a first and a third guide means part 111, 113 each designed in the form of a guide bushing and the particular free end of which defines the first and third valve opening 120, 122 respectively; the bushing comprised in the first guide means part 111 is made of steel by means of turning and drilling, the bushing comprised in the third guide means part 113 from aluminum using high pressure molding. The two guide bushings are chamfered at their ends away from one another in the edge region in order to facilitate installation into a valve seat.

A second guide means part 112 extends between these two guide bushings in the form of three cylindrical guide pins in parallel alignment with the longitudinal axis of the guide means 110 and to the axial direction of movement of the shut-off body 100 arranged with an equidistant spacing around the shut-off body 100 (cf. FIGS. 3 to 5 and 8 to 10 respectively). Each of the three pins is positioned in a way to slidably co-operate with the second shut-off body region 104 of the shut-off body 100 at its movement between the close-position and the open-position and to guide it thereby; in the second valve embodiment, the second shut-off body region 104 is comprised in the second shut-off body part 102. The surface areas of the guide pins involved in this relative movement form the second guide means region 115 of the second guide means part 112. The gaps limited this way by the first and third guide means part 111, 113 and the guide pins of the second guide means part 112 constitute the second valve opening 121. Each of the guide pins of the second guide means part 112 is permanently fixed to the two guide bushings. The guide pins as standard semi-finished parts are manufactured by appropriate cutting from steel bar stock that already has the required surface quality. The mounting holes in the two guide bushings for establishing a permanent joint with one pin end in each case are provided as blind holes and dimensioned so that a reliable permanent compression joint between each guide bushing and each guide pin exists.

In both embodiments, the first valve opening 120 constitutes the control port for pilot controlling the valve 1. Regarding the use of the second and third valve opening 121, 122, the two valve embodiments differ from each other insofar as in the first embodiment the inlet of the valve 1 is defined by the second valve opening 121 and the outlet by the third valve opening 122, while in the second embodiment the second valve opening 121 defines the outlet and the third valve opening 122 the inlet of the valve 1.

The guide bushing comprised in the third guide means part 113 has in its region adjacent to the second guide means part 112 a funnel-shaped tapering lead-in-area (cf. FIGS. 4 and 9 respectively) in which are formed between the mounting holes for the guide pins in each case four equidistantly spaced-apart Y-shaped recesses 117 of the depth of the blind holes. Each of these recesses is designed as a cutout over the entire wall thickness of the guide bushing and is oriented with its gap-shaped part in the direction toward the third valve opening 122. This formation of the third guide means part 113 allows a largely steady change of the volume flow when switching between the close-position and the open-position during operation of the valve 1.

Figure 4:
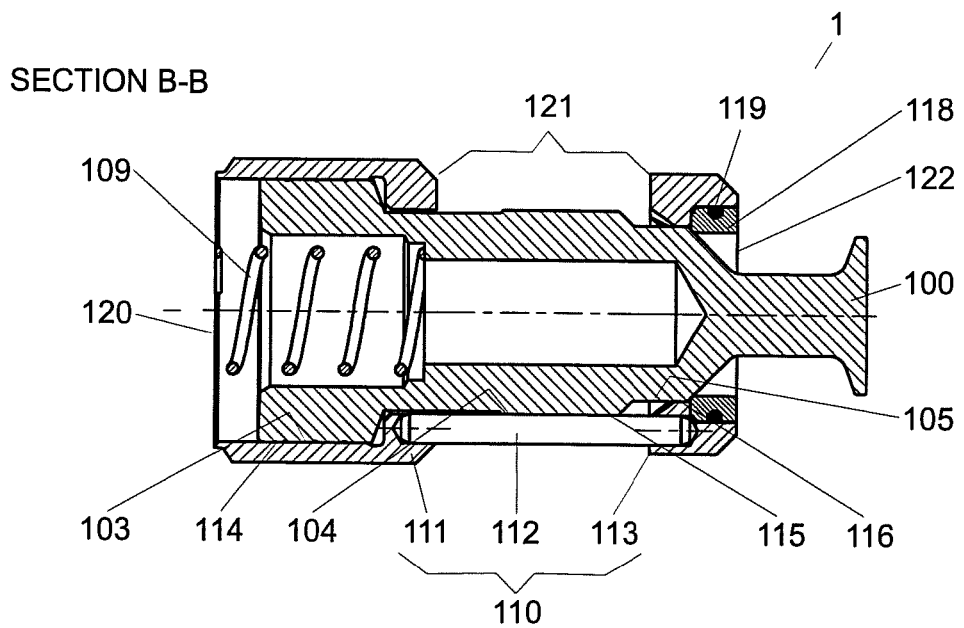
FIG. 4 is a sectional view of the valve embodiment of FIG. 1.
Figure 9:
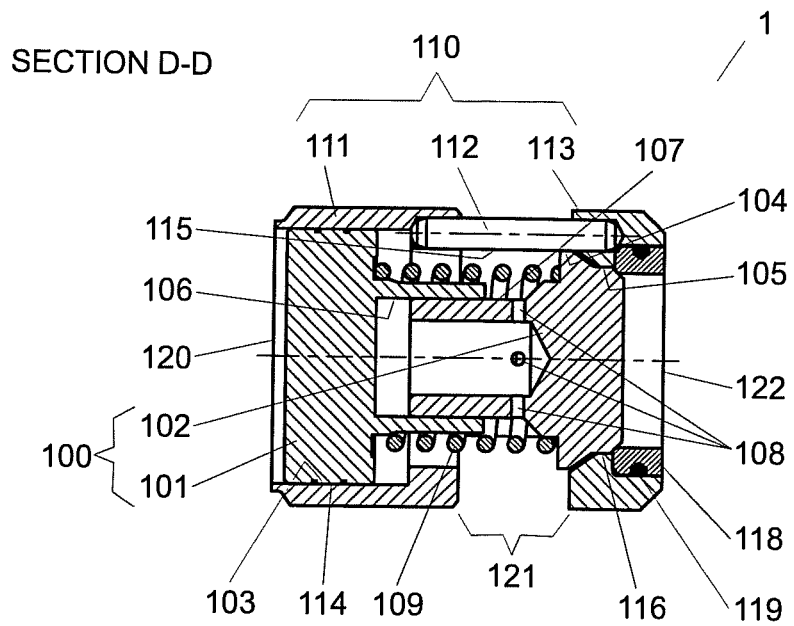
FIG. 9 is a sectional view of the valve embodiment of FIG. 6.

The surface of the guide bushing comprised in the third guide means part 113 facing the shut-off body 100 forms the third guide means region 116 (cf. FIGS. 4 and 9 respectively). This guide bushing has a recess at its front end in which a self-positioning ring-shaped seal insert 118 is mounted flush with an O-ring 119; the seal insert 118 is made of steel as a turned part, the O-ring 119 in a conventional manner from a suitable elastomer, e.g. from a synthetic rubber, preferably from NBR (nitrile-butadiene-rubber). For that, the O-ring 119 is accommodated in a groove in the peripheral surface of the seal insert 118, which has a slightly enlarged cross-section as against the cross-section of the O-ring. The recess for receiving the seal insert 118 is, moreover, formed with a slightly enlarged inner diameter with respect to the outer diameter of the latter and serves as abutment for the O-ring 119 to which it is applied under tension. The frontal end of the third guide means region 116 such shaped can thus sealingly co-operate in the form of the seal insert 118 in a self-positioning manner with the third shut-off body region 105 of the shut-off body 100 and of the second shut-off body part 102 respectively in the close-position of the valve 1, wherein the annular edge of the seal insert 118 nearest to the shut-off body 100, which is produced by embossing, forms the contact line and its inner diameter defines the opening diameter of the valve 1; the third shut-off body region 105 of the shut-off body 100 and of the second shut-off body part 102 respectively is thereto formed with a bevel in the contact area. With this type of mounting, the seal insert 118 can particularly simply be replaced, e.g. in case of damage, which not only has an advantageous effect on maintenance costs, but on valve lifetime, too.

The shut-off body 100 is in the first as in the second embodiment of the valve made of steel as turned part and slidably supported in the guide means 110. In the first embodiment of the valve 1, the shut-off body is provided with a pistil-shaped projection at its outlet end to improve the switching behavior of the valve 1. This projection is integrally formed with the shut-off body 100 and designed so that it protrudes from the third valve opening 122 in any position of the shut-off body 100 during operation of the valve 1 and can be passed through the ring-shaped seal insert 118 in the third guide means part 113 when the valve is assembled. In the second embodiment of the valve 1, the corresponding front end of the shut-off body 100 is formed flat, without protruding from the third valve opening 122.

Each of the two valve embodiments has a retaining means 109 in the form of a cylindrical compression spring made of spring steel, by the retaining force of which the shut-off body 100 can be biased against the guide means 110 in its close-position; the particular spring to be used is selected in accordance with the working fluid pressures prevailing in each case. The arrangement of the retaining means 109 in the first embodiment of the valve specifically can be inferred from FIGS. 2 and 4, in the second embodiment of the valve from FIGS. 6 to 10.

Figure 2:
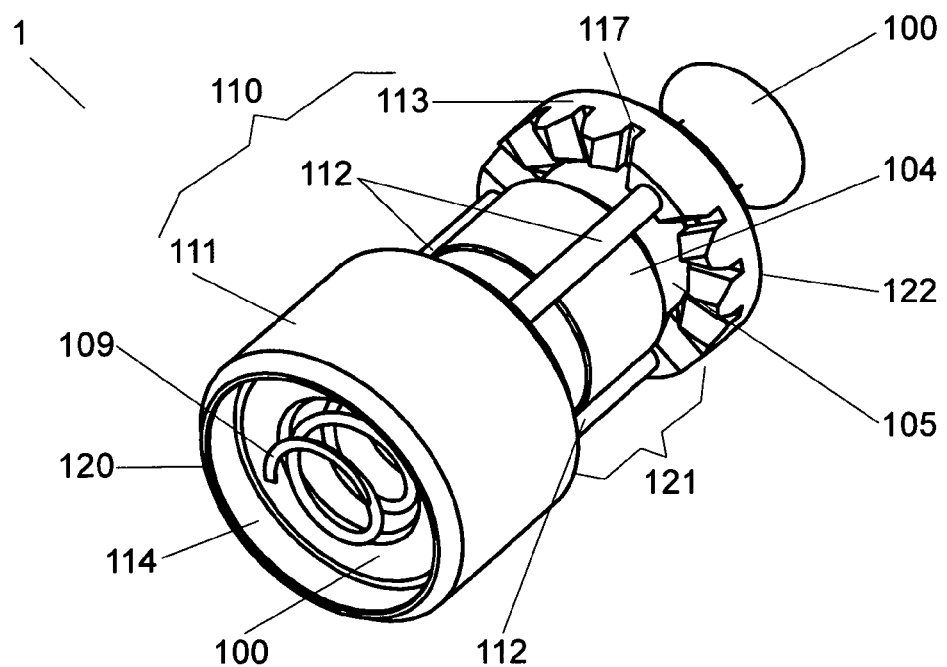
FIG. 2 is another perspective view of the valve embodiment of FIG. 1.
Figure 7:
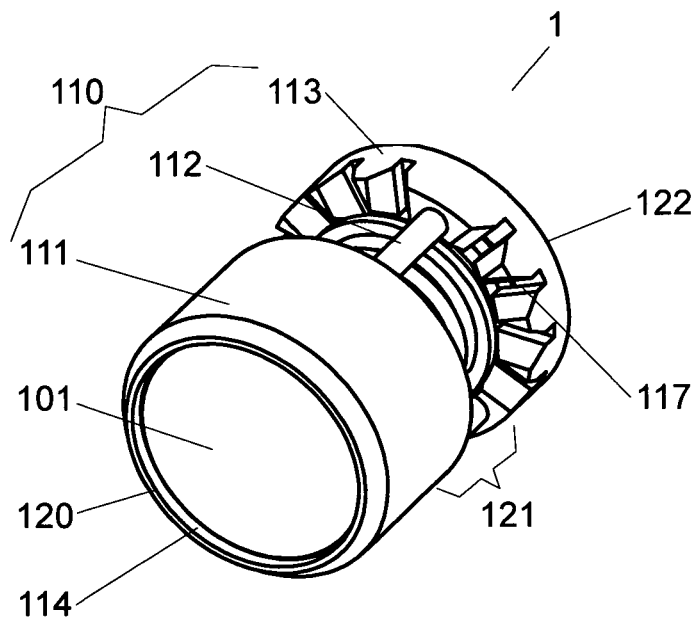
FIG. 7 is another perspective view of the valve embodiment of FIG. 6.

FIGS. 2 and 7 show the first and second embodiment of the valve 1 each in a perspective top view as viewed from the first valve opening 120 to the third valve opening 122; in both cases the shut-off body 100 can be seen in its particular rest position in the first valve opening 120. The first valve opening 120 is formed circular in the first guide means part 111 of the guide means 110 in each case. The shut-off body 100 movable relative to the first valve opening 120 is provided in both embodiments of the valve with a planar front end facing said valve opening, i.e. the control port, which is of particular advantage for an interaction with actuators. In the first valve embodiment according to FIG. 2, this planar frontal end is provided with a centric blind hole, which is intended for mounting and guiding the cylindrical compression spring used as retaining means 109. The spring is mounted in the blind hole in such a way that it extends into the internal space of the first shut-off body part 111 confined by the first guide means region 114 in the unloaded state as shown. That way, the spring can be compressed through the first valve opening 120 during operation of the valve in order to hold the shut-off body 100 in its close-position.

Figure 3:
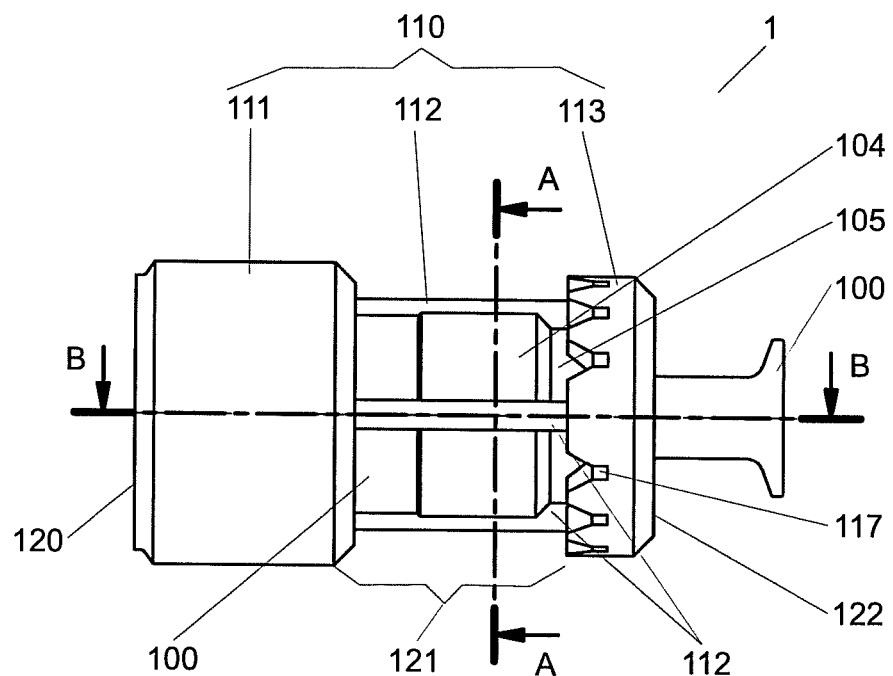
FIG. 3 is a side view of the valve embodiment of FIG. 1.
Figure 8:
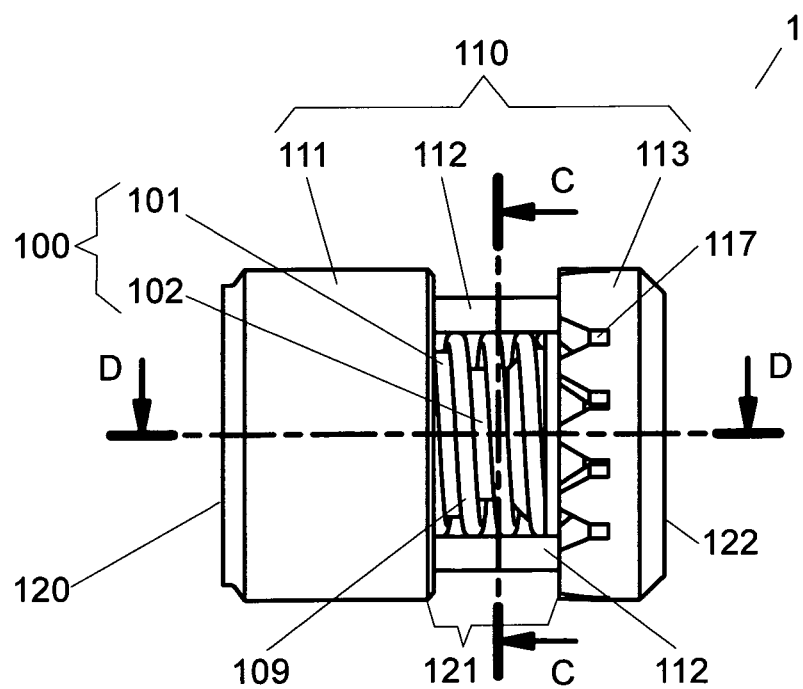
FIG. 8 is a side view of the valve embodiment of FIG. 6.

In FIGS. 3 and 8, the first and second embodiment of the valve 1 is illustrated in each case in a side view with the third valve opening 122 closed. FIG. 4 shows the first valve design in a sectional view taken along the intersecting line B-B, FIG. 5 in a further sectional view taken along the intersecting line A-A in each case according to FIG. 3. Corresponding sectional views of the second valve embodiment are depicted in FIG. 9 taken along the intersecting line D-D and in FIG. 10 taken along the intersecting line C-C in each case according to FIG. 8.

The co-operation of the shut-off body 100 and the guide means 110 and the specific configuration of the one- and two-part shut-off body 100 respectively are to be taken in particular from FIGS. 4 and 9 respectively. According to FIG. 4, the shut-off body of the first valve embodiment is made in one piece in the shape of a circular cylinder having different diameters along the longitudinal axis of the cylinder. The guide means 110 and the shut-off body 100 are disposed on a common longitudinal axis so that the shut-off body during its actuation is guided by the first and second guide means region 114, 115 of the first and second guide means part 111, 112 and abuts in its close-position on the third guide means region 116 of the third guide means part 113. To this end, the shut-off body 100 has at its end facing the first valve opening 120 with the first shut-off body region 103 the largest outer diameter. The shut-off body 100 is with the third shut-off body region 105 associated with the third valve opening 122 so that the second shut-off body region 104 is located between the first and third shut-off body region 103, 105. The outer diameter of the shut-off body 100 is reduced in the second shut-off body region 104 over the outer diameter of the first shut-off body region 103, while it is reduced in the third shut-off body region 105 over the one in the second shut-off body region 104; the surfaces intended for sliding co-operation 103, 104 of the shut-off body 100 and 112, 114 of the guide means 110 are each produced by roller-burnishing. Moreover, the diameter of the shut-off body 100 in the third shut-off body region 105 is in both valve embodiments larger than the opening diameter of the valve 1 as defined by the seal insert 118. Correspondingly, the inner diameter of the first guide means part 111 is larger than the one of the second guide means part 112, the inner diameter of which in turn is larger than the one of the third guide means part 113.

In the transition region between the first and second shut-off body region 103, 104 as well as between the second and third shut-off body region 104, 105, the shut-off body 100 according to FIG. 4 is in each case provided with a bevel, wherein said bevels being arranged along the longitudinal axis of the valve body in such a way that there is no contact between the particular region of the bevel and the first and third guide means part 111, 113 respectively in the close-position of the valve. To further reduce the friction between the shut-off body 100 and the first and second guide means part 111, 112, the shut-off body regions 103, 104 which slidably co-operate with the corresponding guide means regions 114, 115 at a movement of the shut-off body 100 in addition are adjusted in terms of the size of their effective area. In the first embodiment of the valve 1 as shown in FIGS. 1 to 5, the second shut-off body region 104 is partially realized with a smaller outer diameter for this reason.

The blind hole formed for receiving the compression spring provided as retaining means 109 in the first embodiment of the valve is carried out with a first diameter as far as the region of the bevel between the first and third guide means region 103, 104. This is followed by a section with a second diameter which is somewhat reduced compared to the first one. This section serves to center the compression spring. The bore continues with a reduced third diameter compared to the second diameter and ends in the region of the chamfered end of the third shut-off body region 105. The first, second, and third bore diameter in each case is selected so that the shut-off body 100 has approximately the same wall thickness over its entire length without compromising the mechanical stability. This design of the shut-off body 100 causes in addition to a more reliable positioning of the retaining means 109 in particular also a reduction in weight, which both affects the dynamic behavior of the valve 1 in the first embodiment in an advantageous way.

In the second valve embodiment according to FIGS. 6 to 10, the shut-off body 100 comprises two substantially circular cylindrical shut-off body parts 101, 102. Each of these shut-off body parts is arranged with its cylindrical axis coincident with the longitudinal axis of the valve and is displacably supported along the longitudinal valve axis relative to the first, second, and third guide means part 111, 112, 113 and to the other shut-off body part. The two circular-cylindrical shut-off body parts 101, 102 are formed as hollow cylinders in the region corresponding with the second valve opening 121 in each case, wherein the outer and inner diameters are selected so that, in addition to a sufficient mechanical stability in each case, the hollow cylinder comprised in the first shut-off body part 101 with a fourth shut-off body region 106 partially encloses the hollow cylinder comprised in the second shut-off body part 102 with a fifth shut-off body region 107. In the hollow cylinder comprised in the second shut-off body part 102 four pressure equalizing bores 108 (cf. FIG. 10) are provided which connect the internal space of the shut-off body 100 formed that way with the outlet region of the valve 1, or with the second valve opening 121, hence ensure the relocatability of the two shut-off body parts 101, 102 relative to each other during operation of the valve. The length of the fourth shut-off body region 106 is reduced compared to the length of the fifth shut-off body region 107 so that each pressure equalizing bore 108 is located outside of the potential region of overlap in the fifth shut-off body region 107 and pressure equalization is always ensured. The first and second shut-off body part 101, 102 are provided with defined surface characteristics by roller-burnishing in the region of its largest outer diameter in each case, which allows a sliding co-operation with the guide means regions 112, 114 provided for that purpose in the guide means 110, which are manufactured with a corresponding surface finish. In the same manner the lateral areas of the hollow cylinders in the fourth shut-off body region 106 of the first shut-off body part 101 and in the fifth shut-off body region 107 of the second shut-off body part 102 are processed.

By means of a cylindrical compression spring as the retaining means 109 which in each case encloses at least partially the two hollow cylinders without coming into contact with the guide means parts 111, 112, 113 and which is coupling the two shut-off body parts 101, 102 so that the fourth shut-off body region 106 of the hollow cylinder of the first shut-off body part 101 overlaps over about half its length with the fifth shut-off body region 107 of the hollow cylinder of the second shut-off body part 102 in the close-position of the valve and without pressure application to the first valve opening 120, the relative relocatability of the two shut-off body parts 101, 102 is ensured on the one hand with respect to the guide means parts 111, 112, 113 and on the other hand with respect to each other. The first guide means part 111 and the retaining means 109 are dimensioned in axial direction in each case so that the shut-off body 100 of the non-pressurized valve does not protrude with its first shut-off body part 101 from the first valve opening 120, while the second shut-off body part 102 closes the third valve opening 122.

Because of this preferred configuration of the valve 1 and the adjustment of the compression spring used as retaining means 109 to the particular minimum working fluid pressure occurring during operation of the valve 1 at the third valve opening 122, or the inlet, an automatic adjustment of the operating point of the valve is enabled. This is possible insofar as the shut-off body 100 can respond to pressure fluctuations at the first or third valve opening 120, 122 by moving of the first or second shut-off body part 101, 102, on the one hand. On the other hand, the shut-off body 100 can react to a change in the pressure level at the first valve opening 120 and/or at the third valve opening 122 in a differentiated way in each case by changing of its length or position relative to the third valve opening 122 and/or the first valve opening 120, and with it to the second valve opening 121. For this purpose, the retaining force of the compression spring in each case is selected so that even a minimum increase in pressure in the working fluid at the third valve opening 122, or the valve inlet, is sufficient to open the valve 1, so to move the second shut-off body part 102 without simultaneously moving the first shut-off body part 101 and, hence, to allow a volume flow of the working fluid through the valve 1 from the third valve opening 122, or the valve inlet, to the second valve opening 121, or the valve outlet; a complete penetration of the hollow cylinder of the second shut-off body part 102 in the hollow cylinder, or rather, bore-hole of the first shut-off body part 101—and thus a rigid coupling of the two shut-off body parts 101, 102—is only possible on a load pressure of the working fluid at the third valve opening 122 and/or at the first valve opening 120 that is able to overcome the retaining force provided by the compression spring as retaining means 109 with a corresponding reduction in length of the spring.

Figure 5:
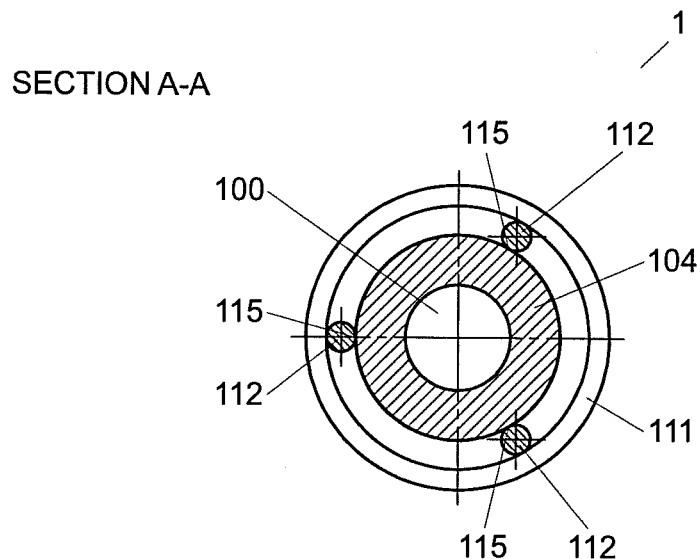
FIG. 5 is another sectional view of the valve embodiment of FIG. 1.
Figure 10:
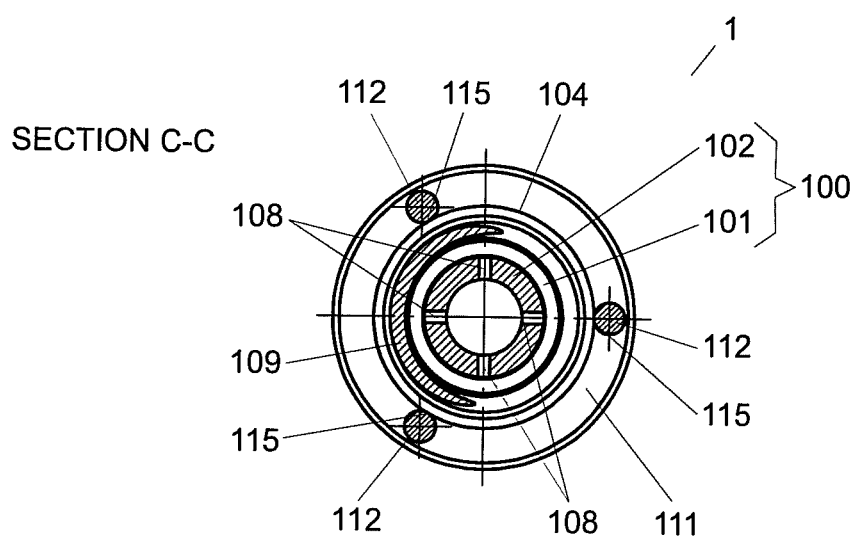
FIG. 10 is another sectional view of the valve embodiment of FIG. 6.

From the sectional views of the first and second embodiment of the valve 1 according to FIGS. 5 and 10 respectively are apparent in detail the equidistant arrangement of the three cylindrical guide pins of the second guide means part 112 in the first guide means part 111 in each case, the association of these three guide pins to said second shut-off body region 104 of the shut-off body 100, and the contact lines of the three guide pins with the shut-off body 100 constituting the second guide means region 115 of the second guide means part 112. Moreover, the location of the four pressure equalizing bores 108 in the second shut-off body part 102 of the second valve embodiment can be seen in FIG. 10 as well as the positioning of the cylindrical compression spring provided as retaining means 109 relative to the particular first guide means part 111 and the shut-off body part 101.

Figure 11:
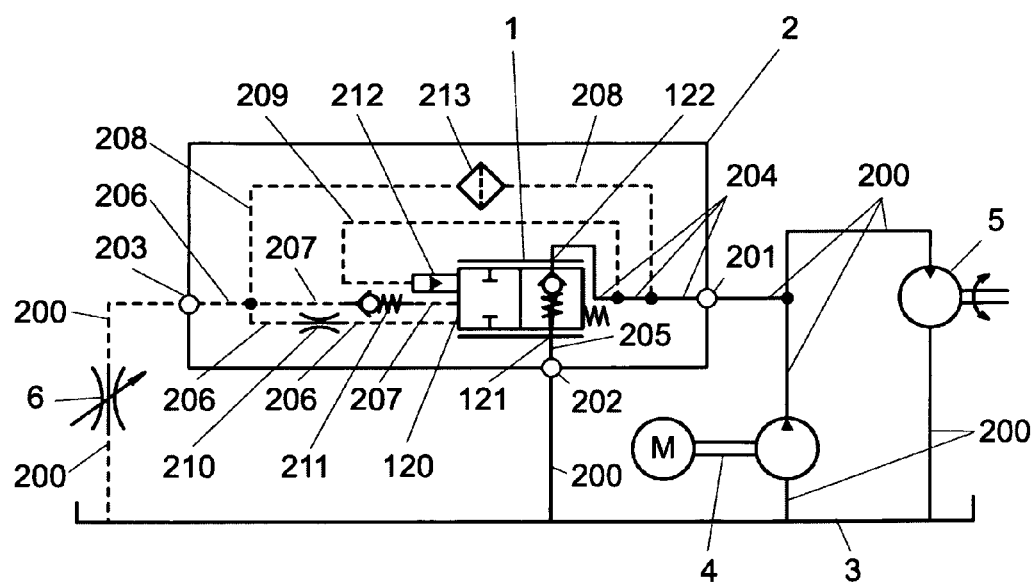
FIG. 11 is a circuit diagram of a hydraulic apparatus with the second embodiment of the inventive valve in a fluid system.
Figure 12:
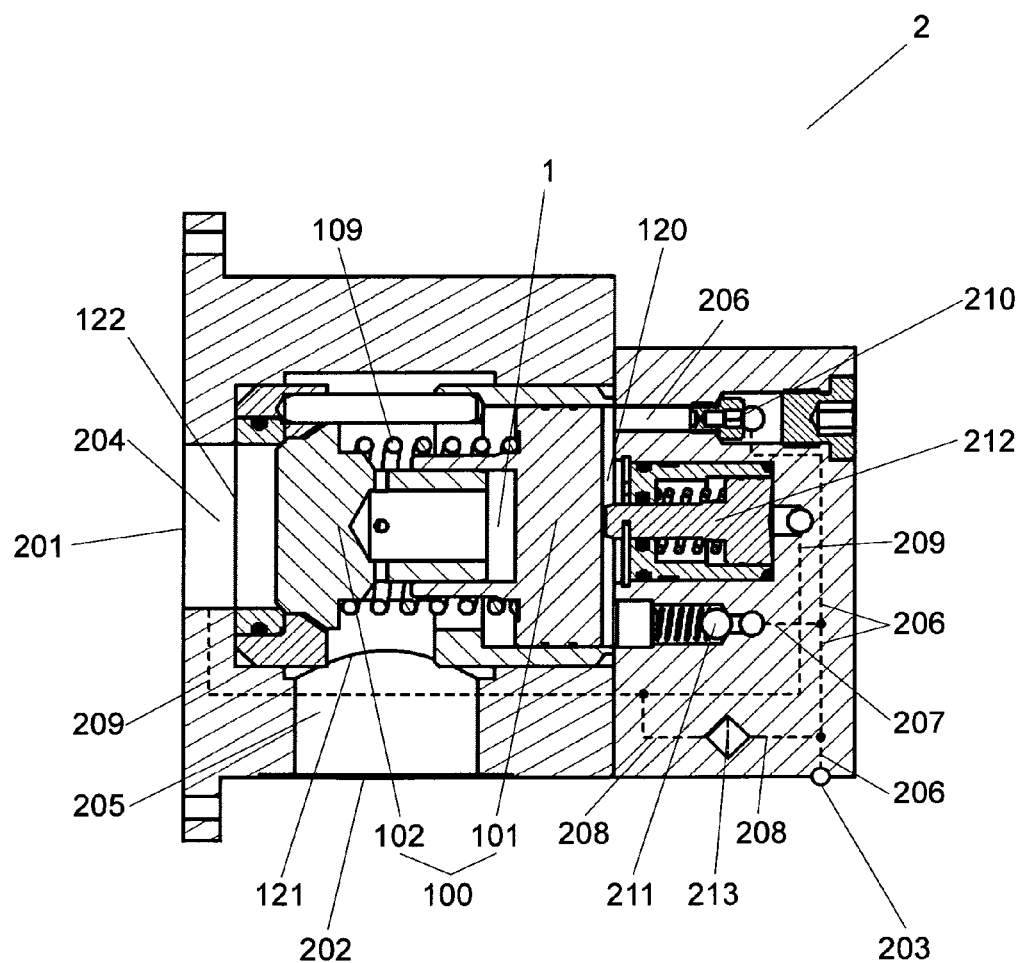
FIG. 12 is a constructive version of the apparatus of FIG. 11 in sectional view.

FIGS. 11 and 12 show an embodiment of the hydraulic apparatus 2 with the second embodiment of the inventive valve 1 in the form of a flow scheme and of a structural design. As the working fluid a hydraulic oil is provided.

According to FIG. 11, the apparatus 2 comprises in addition to the inventive valve 1 with a two-part shut-off body 100, or differential piston (cf. FIG. 9), a throttle element 210, a check valve 211, a hydro-mechanical transmission means 212, and a filter 213, as well as a hydraulic power conduit from a first working fluid port 201 to the third valve opening 122 and further from the second valve opening 121 to a second working fluid port 202, and hydraulic control conduits from said first working fluid port 201 to the first valve opening 120 and to a third working fluid port 203. The throttle element 210 is configured in a conventional manner for damping of a volume flow of a working fluid between an inlet and an outlet and can be coupled via these two ports to a flow connection. Similarly, the check valve 211 is configured in a conventional manner with a piston and a biasing means in the form of a compression spring between an inlet and an outlet so that when a switching threshold defined by the biasing means is exceeded by the pressure of the working fluid at the inlet, the check valve opens in its forward direction while a working fluid flow in the opposite direction between the two ports which are connectable to the flow path is prevented. The hydro-mechanical transmission means 212 comprises between a hydraulic and a mechanical port a tappet which is displacably mounted against a compression spring in a cupular guide sleeve. This tappet co-operates with the guide sleeve in such a way that a pressure application by the working fluid at the hydraulic port results in a movement of the tappet against the restoring force of the spring at the mechanical port, while avoiding a working fluid transfer between the two ports. The hydro-mechanical transmission means 212 is therefore a conventional pressure-displacement-converter, which allows a hydraulic pressure signal to be converted into a proportional mechanical displacement signal. The filter 213 is a hydraulic filter of conventional design which is connectable by means of an inlet having a flow path for supplying a working fluid and a mesh size selected such that impurities in the working fluid such as solid particles are retained when the working fluid exits from the filter via the outlet. For the flow connection of said components are provided in the apparatus 2 a first and second hydraulic power conduit 204, 205 and a first, second, third, and fourth hydraulic control conduit 206, 207, 208, 209. These conduits may in principle be made in a flexible and/or rigid design of the materials commonly used in hydraulic applications, that is for example from metal, plastic, or rubber and may be formed as separate elements and/or as recesses in a housing preferably made of metal. The control conduits 206, 207, 208, 209 are different from the hydraulic power conduits 204, 205 in this embodiment of the apparatus 2 only by its smaller inner diameter (cf. FIG. 12).

The external configuration of the apparatus 2, or rather, its flow connection with a fluid system takes place via the first, second, and third working fluid port 201, 202, 203. The first working fluid port 201 is connected to the third valve opening 122 via the first power conduit 204 and the second working fluid port 202 to the second valve opening 121 via the second power conduit 205 for establishing the particular flow connection. The third working fluid port 203 is on the one hand connected via the first control conduit 206, which comprises the throttle element 210, and via the second control conduit 207 in parallel thereto, which comprises the check valve 211, for establishing of the flow connection to the first valve opening 120. On the other hand, the third working fluid port 203 is connected via the third control conduit 208 for establishing a flow connection to the first working fluid port 201, wherein in the third control conduit 208 the filter 213 is disposed. A fourth control conduit 209 is provided to establish the flow connection between the hydro-mechanical transmission means 212 attached to the first valve opening 120 and the first working fluid port 201.

The volume flow of the working fluid to be controlled by the apparatus 2 may according to FIG. 11 be generated by a motor-driven pump 4 with a fixed direction of rotation which is arranged in the flow path 200 between a reservoir 3 for supplying the working fluid and a consumer 5 in the form of a hydraulic motor. When the pump 4 is started, the working fluid flows in the flow path 200 in the first direction from the reservoir 3 to the consumer 5 for driving it. The working fluid exiting from the consumer 5 in this operating mode flows through the flow path 200, which is continued from the consumer 5, in the second direction back to the reservoir 3.

The flow path 200 has between the pump 4 and the consumer 5 a flow connection with the first working fluid port 201 of the apparatus 2 and is continued from the second working fluid port 202 to the reservoir 3, with which the third working fluid port 203 also is connected by a flow path 200. As long as the third working fluid port 203 is open, the working fluid hence flows with the pump 4 being switched on back to the reservoir 3 controlled by the valve 1 without the output side charged consumer 5 being driven. Via the flow path 200, the first working fluid port 201, the third control conduit 209, and the hydro-mechanical transmission means 212 a pre-positioning of the piston—shut-off body 100 according to FIG. 12—in the direction of closing of the valve 1 takes place in this bypass mode of the consumer 5 at the same time, which is proportional to the output load in each case acting on the consumer 5. The switching of the flow direction of the volume flow of the working fluid in the flow path 200 from the second to the first direction, or rather, from the bypass mode to the operating mode of the consumer 5 may be carried out therefore independent of load-pressure and largely without dead time by closing the third working fluid port 203 of the apparatus 2. For that, the flow path 200 has a controllable throttle element 6 between the third working fluid port 203 and the reservoir 3.

FIG. 12 shows a constructive version of the apparatus 2 according to FIG. 11 in section. This comprises a rectangular metallic valve block having a central bore between two of its boundary surfaces and in parallel orientation to its orthogonal base. The central bore is formed as a blind bore from the first of the two boundary surfaces for receiving the valve 1 in the embodiment of FIG. 9 and continued to the congruent boundary surface with a reduced diameter adapted to the third valve opening 122. The section of the bore extending between this boundary surface and the blind bore forms the first hydraulic power conduit 204 with its end in the boundary surface representing the first working fluid port 201. Via this, the apparatus 2 is fluid-mechanically connectable with further hydraulic control components such as those comprised in a hydraulic drive system for an elevator; for the leak-proof connection protrusions with holes for a screw connection are provided on the base and on the top face of the cube-shaped valve block of the apparatus 2. Orthogonally through the valve seat formed as a blind bore is extending a further blind bore from the base of the valve block of the apparatus 2. This forms the second hydraulic power conduit 205 and is arranged in relation to the first valve 1 in the housing such that it enables a flow connection with the second valve opening 121 and forms the second working fluid port 202 in the base of the valve block. For the fluid-mechanical connection of the latter with a further hydraulic circuit component threaded holes are provided in the base of the valve block, which in turn allow a leak-proof screw connection of the valve block with a respective circuit component in the usual way.

With another screw connection, the valve block is finally connected in a leak-proof manner with a transmission means block also made of metal. This comprises, in addition to the hydro-mechanical transmission means 212, the throttle element 210 and the check valve 211 in such a way that the tappet of the hydro-mechanical transmission means 212 at the first valve opening 120 centrically interacts with the first shut-off body part 101 of the shut-off body 100 of the valve 1, while a flow connection exists with the first valve opening 120 via the first control conduit 206 having the throttle element 210 and via the second control conduit 207 having the check valve 211. The transmission means block further comprises a third control conduit 208 having the filter 213 in flow connection with the first control conduit 206 and a section of the fourth control conduit 209, which is continued in the valve block in a second section 209 next to the valve seat of the first valve 1 to the first power conduit 204 according to FIG. 11. The first control conduit 206 extends within the transmission means block and has the third working fluid port 203 at its end facing away from the contact surface with the valve block, the fluid mechanical connection of the latter with other hydraulic system components again can be reliably established by means of threaded bores in its peripheral region in a leak-proof manner. As the power conduits, the control conduits are produced by drilling in a conventional manner, wherein the bores in each case are executed from the boundary surfaces of the valve block and transmission means block respectively and sealed in a leak-proof manner by means of a conventional expander there where the continuation of a flow connection at the particular boundary surface of the metal block in question is not provided.

The apparatus 2 illustrated in FIG. 12 thus enables load-independent and largely dead time-free switching of the flow direction of the volume flow of the working fluid in a flow path connected to the apparatus 2 as indicated in detail in connection with FIG. 11. Thanks to its modular design, the apparatus 2 not only is space-saving and cost-effective in production, but is characterized in particular by its ease of maintenance and corresponding low maintenance costs, too.

LIST OF REFERENCE NUMERALS 1 valve
100 shut-off body
101-102 first to second shut-off body part
103-107 first to fifth shut-off body region
108 pressure equalizing bore
109 retaining means
110 guide means
111-113 first to third guide means part
114-116 first to third guide means region
117 recess
118 seal insert
119 O-ring
120-122 first to third valve opening
2 apparatus
200 flow path
201-203 first to third working fluid port
204-205 first to second power conduit
206-209 first to fourth control conduit
210 throttle element
211 check valve
212 hydro-mechanical transmission means
213 filter
3 reservoir
4 motor-driven pump
5 consumer
6 controllable throttle element

The invention claimed is:

1. A valve for controlling a volume flow of a working fluid in a flow path, comprising a first valve opening, a second valve opening, and a third valve opening, a shut-off body movable to and fro between an open-position in which the third valve opening is open to allow a volume flow of the working fluid between said second valve opening and said third valve opening and a close-position in which the third valve opening is closed by the shut-off body, a guide to guide the shut-off body between the open-position and the close-position, and a retainer to exert a retaining force on the shut-off body in the close-position, wherein the shut-off body is formed at least one-part and the guide means has in successive arrangement a first guide part with a first guide region, a second guide part with a second guide region, and a third guide part with a third guide region in permanent joint, wherein the first guide part and the third guide part are formed to surround the shut-off body and the second guide part includes a plurality of pins in parallel alignment with the direction of movement of the shut-off body so that the movement of the shut-off body relative to the guide can take place in sliding co-operation with said first guide region and said second guide region and closing of the third valve opening by the shut-off body in sealing co-operation with the third guide region, wherein the second guide region includes a part of a surface of at least one of the pins, and wherein said first guide part includes the first valve opening for exerting an actuating force on the shut-off body in the direction of the third valve opening, the second guide part includes the second valve opening, and the third guide part includes the third valve opening.

2. The valve according to claim 1, wherein the guide is formed with an inner diameter which is reduced or increased from the first guide part to the second guide part through to the third guide part in each case and the shut-off body is formed with a respective first shut-off body region, a respective second shut-off body region, and a respective third shut-off body region with a corresponding outer diameter in each case so that the movement of the shut-off body relative to the guide can be limited by the third guide part or the first guide part.

3. The valve according to claim 1, wherein the third guide part has in its region adjacent to the second guide part at least one of (i) a plurality of recesses and/or (ii) a bevel so that the movement of the shut-off body within the third guide part enables a continuous change in the effective area of the third valve opening.

4. The valve according to claim 3 wherein said recesses are formed at least in one of U-, V-, or Y-shape.

5. The valve according to claim 1, wherein the third guide part in its third guide region comprises a self-positioning ring-shaped seal insert for a sealing co-operation with the shut-off body during closure of the third valve opening in a releasable connection, wherein the seal insert is formed in such a way that it contacts the third shut-off body region of the shut-off body in the close-position along a circular contact line in a sealing manner.

6. The valve according to claim 1, wherein the shut-off body is formed one-part and can be biased by the retaining force of the retainer to co-operate with the guide in the shut-off body's direction of movement toward the third guide part so that the retaining force of the retainer counteracts a movement of the shut-off body from the close-position to the open-position.

7. The valve according to claim 6, wherein the retainer comprises a compression spring, wherein the compression spring is attached at one end to the frontal outer surface of the shut-off body facing the first valve opening or to the inner surface of a recess formed in said outer surface and with the other end extends into the first guide part so that the shut-off body can be biased by the compression spring via the first valve opening towards the third valve opening.

8. The valve according to claim 1, wherein the shut-off body is formed two-part with a first shut-off body part and with a second shut-off body part, wherein the first shut-off body part includes the first shut-off body region and a fourth shut-off body region and the second shut-off body part includes the second shut-off body region, and third shut-off body region, and a fifth shut-off body region, wherein said fourth shut-off body region and said fifth shut-off body region are supported slidably interlocking in such a way that the length of the shut-off body is variable, and wherein the retainer is arranged in such a way between the first shut-off body region and the second shut-off body region that in its rest position the fourth shut-off body region and the fifth shut-off body region overlap and the length of the shut-off body can be reduced by displacing the two shut-off body parts against the retaining force of the retainer.

9. The valve according to claim 8, wherein the first shut-off body part is formed with the second shut-off body region for sliding co-operation with the second guide means region.

10. The valve according to claim 8, wherein the retainer includes a compression spring to co-operate with said first shut-off body part and said second shut-off body part of the shut-off body, wherein the compression spring is designed in such a way that the length of the shut-off body in the rest position of the compression spring can be reduced by an actuating force acting on the frontal outer surface of the first shut-off body part facing the first valve opening in the direction of the third valve opening and/or on the frontal outer surface of the second shut-off body part facing the third valve opening toward the first valve opening in each case against the retaining force of the compression spring.

11. The valve according to claim 10, wherein the compression spring is attached at one end to the outer surface of the first shut-off body part at the end of the fourth shut-off body region facing the first shut-off body region and at the other end to the outer surface of the second shut-off body part at the end of the fifth shut-off body region facing the second shut-off body region or at one end to the inner surface of the first shut-off body part and at the other end to the inner surface of the second shut-off body part so that the shut-off body can be biased in each case by the compression spring via the first valve opening toward the third valve opening.

12. The valve according claim 1, wherein the shut-off body, and the first guide part, and the third guide part are made of steel, brass, aluminum, or plastic and each of the pins in the second guide part is made of steel and each steel-pin is permanently fixed at one end to the first guide part and at the other end to the third guide part by a compression joint.

13. The valve according to claim 12, wherein each of the pins in the second guide part is made as a finished part.

14. The valve according to claim 1, wherein the shut-off body is provided with a pistil-shaped projection at its end associated with the third guide part, wherein the pistil-shaped projection is formed in a manner that the shut-off body is movable in the direction of the retaining force of the retainer by a volume flow of the working fluid directed from the second valve opening to the third valve opening after exiting from the third valve opening.

15. A method for manufacturing a valve for controlling a volume flow of a working fluid in a flow path, having a first valve opening, a second valve opening, a third valve opening, an at least one-part shut-off body movable between an open-position in which the third valve opening is open to allow a volume flow of the working fluid between said second valve opening and said third valve opening and a close-position in which the third valve opening is closed by the shut-off body, a guide to guide the shut-off body between the open-position and the close-position, and a retainer to exert a retaining force on the shut-off body in the close-position, comprising the steps of:
providing the shut-off body for sliding co-operation with said guide;
providing a first guide part having a first guide region for enclosing the shut-off body, and for sliding co-operation with the latter, and for forming the first valve opening;
providing a third guide part having a third guide region for enclosing the shut-off body, and for sliding co-operation with the latter, and for forming the third valve opening;
providing a plurality of pins for forming a second guide part having a second guide region for sliding co-operation with the shut-off body and for forming the second valve opening;
establishing a connection between one end of each pin and said first guide part, and between the other end of each pin and the third guide part in parallel alignment with each pin to the moving direction of the shut-off body so that between the first guide part and the third guide part the second guide part is formed having the second valve opening, the first valve opening is formed at the free end of the first guide part, the third valve opening is formed at the free end of the third guide part, and the guide for guiding the shut-off body is formed from the first guide part, the second guide part, and the third guide part in successive arrangement and in permanent joint;

providing the retainer to exert the retaining force on the shut-off body in the close-position;

placing the retainer on the shut-off body so that the retaining force of the retainer acts in the direction of the close-position of the shut-off body;

disposing the shut-off body and the retainer in the guide so that the movement of the shut-off body relative to the guide takes place in sliding co-operation with the first guide region and a part of the surface of at least one of the pins of the second guide region and the closing of the third valve opening by the shut-off body under sealing co-operation with the third guide region and under the action of the retaining force of the retainer.

16. An apparatus for the load-pressure-compensated control of a volume flow of a working fluid from a second direction to a first direction in a flow path against a time varying load pressure acting in said second direction in the flow path, wherein the apparatus comprises a valve according to claim 8, a throttle element, a check valve, a hydro-mechanical transmission, a first working fluid port to establish a flow connection with the flow path for conducting the volume flow of the working fluid in the first direction, and a second working fluid port, and a third working fluid port to establish a particular flow connection with the flow path for conducting the volume flow of the working fluid in the second direction, a flow connection between said first working fluid port and each of said third working fluid port and the first valve opening, and further a flow connection is provided between each of the third valve opening and said first working fluid port, between the second valve opening and said second working fluid port, and between the first valve opening and said third working fluid port, wherein the flow connection between the first valve opening and said third working fluid port includes in a parallel arrangement the throttle element to damp the volume flow of the working fluid from the first valve opening and the check valve for conducting the working fluid to the first valve opening and the flow connection between the first valve opening and said first working fluid port includes the hydro-mechanical transmission to mechanically move the shut-off body at the first valve opening so that at a volume flow of the working fluid in the flow path in the first direction an increase of the working fluid pressure at said first working fluid port enables a pre-positioning of the shut-off body of the valve at the first valve opening in the direction of its close-position by the hydro-mechanical transmission under working fluid flow through the flow connection between said first working fluid port and said third working fluid port and via the check valve to the first valve opening and an increase in the working fluid pressure at said third working fluid port enables a movement of the pre-positioned shut-off body to its close-position for routing the volume flow of the working fluid in the flow path from the second to the first direction.

* * * * *